(12) United States Patent
Rico Alvarino et al.

(10) Patent No.: US 12,003,974 B2
(45) Date of Patent: Jun. 4, 2024

(54) CARRIER SWITCHING AND ANTENNA SWITCHING FOR LONG TERM EVOLUTION AND NEW RADIO DUAL CONNECTIVITY

(71) Applicant: QUALCOMM Incorporated, San Diego, CA (US)

(72) Inventors: Alberto Rico Alvarino, San Diego, CA (US); Masato Kitazoe, Tokyo (JP); Peter Gaal, San Diego, CA (US); Le Liu, Fremont, CA (US); Aziz Gholmieh, Del Mar, CA (US); Umesh Phuyal, San Diego, CA (US); Amir Farajidana, Sunnyvale, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/524,995

(22) Filed: Jul. 29, 2019

(65) Prior Publication Data

US 2020/0037383 A1 Jan. 30, 2020

Related U.S. Application Data

(60) Provisional application No. 62/711,992, filed on Jul. 30, 2018.

(51) Int. Cl.
*H04W 16/14* (2009.01)
*H04B 7/06* (2006.01)
(Continued)

(52) U.S. Cl.
CPC .......... *H04W 16/14* (2013.01); *H04B 7/0602* (2013.01); *H04L 5/0051* (2013.01);
(Continued)

(58) Field of Classification Search
CPC ..... H01Q 1/00; H04L 25/0226; H04L 5/0051; H04L 5/0094; H04W 72/0453;
(Continued)

(56) References Cited

U.S. PATENT DOCUMENTS 10,299,111 B2 * 5/2019 Wu ...................... H04B 7/0404
11,296,420 B2 * 4/2022 Desclos ................... H03J 5/22
(Continued)

FOREIGN PATENT DOCUMENTS

CN 106685621 A 5/2017

OTHER PUBLICATIONS

3GPP TS 38.306, NR, User Equipment (UE) radio access capabilities, V15.1.0 (Mar. 2018) (Year: 2018).*
(Continued)

*Primary Examiner* — Oussama Roudani
(74) *Attorney, Agent, or Firm* — Harrity & Harrity, LLP \ Qualcomm

(57) ABSTRACT

Various aspects of the present disclosure generally relate to wireless communication. In some aspects, a user equipment (UE) may determine an antenna switching capability for the UE that relates to a capability of the UE to switch an antenna for a plurality of bands that are included in a band combination of a set of band combinations supported by the UE, wherein at least two bands of the plurality of bands correspond to a first radio access technology (RAT) and a second RAT respectively. The UE may signal the set of band combinations and the antenna switching capability to a base station. Numerous other aspects are provided.

64 Claims, 9 Drawing Sheets

(51) Int. Cl.
*H04L 5/00* (2006.01)
*H04L 25/02* (2006.01)
*H04W 8/24* (2009.01)
*H04W 72/0453* (2023.01)
*H04W 88/06* (2009.01)
*H04W 88/10* (2009.01)
*H04W 76/16* (2018.01)

(52) U.S. Cl.
CPC .......... *H04L 25/0226* (2013.01); *H04W 8/24* (2013.01); *H04W 72/0453* (2013.01); *H04W 88/06* (2013.01); *H04W 88/10* (2013.01); *H04W 76/16* (2018.02)

(58) Field of Classification Search
CPC ....... H04W 8/24; H04W 88/10; H04W 88/06; H04W 76/16; H04W 16/14; H04B 7/0602
See application file for complete search history.

(56) References Cited

U.S. PATENT DOCUMENTS

| | | | |
|---|---|---|---|
| 2005/0032548 A1* | 2/2005 | Frank | H01Q 21/30 455/552.1 |
| 2007/0018895 A1* | 1/2007 | Bolin | H01Q 3/24 343/702 |
| 2007/0222697 A1* | 9/2007 | Caimi | H01Q 1/50 343/861 |
| 2010/0260147 A1* | 10/2010 | Xing | H04W 36/14 370/332 |
| 2012/0213154 A1* | 8/2012 | Gaal | H04B 7/0608 370/328 |
| 2013/0148636 A1* | 6/2013 | Lum | H04B 1/0067 370/336 |
| 2013/0250820 A1* | 9/2013 | Khlat | H04B 1/0057 370/280 |
| 2014/0219255 A1* | 8/2014 | Eyuboglu | H04L 5/005 370/336 |
| 2014/0334362 A1* | 11/2014 | Granger-Dones | H03J 3/20 334/78 |
| 2015/0017978 A1* | 1/2015 | Hong | H04W 88/06 455/552.1 |
| 2015/0065073 A1 | 3/2015 | Yan et al. | |
| 2016/0037550 A1* | 2/2016 | Barabell | H04W 72/046 455/450 |
| 2016/0373176 A1* | 12/2016 | Khlat | H04B 1/18 |
| 2017/0019808 A1* | 1/2017 | Harel | H04W 24/04 |
| 2017/0063427 A1* | 3/2017 | Lee | H04B 1/126 |
| 2017/0070357 A1 | 3/2017 | Kanayama et al. | |
| 2017/0070904 A1* | 3/2017 | Mali | H04W 24/08 |
| 2017/0215087 A1* | 7/2017 | Amizur | H04W 16/28 |
| 2017/0302419 A1* | 10/2017 | Liu | H04L 5/0098 |
| 2017/0332370 A1 | 11/2017 | Rico Alvarino et al. | |
| 2018/0220486 A1 | 8/2018 | Tseng et al. | |
| 2018/0241369 A1 | 8/2018 | Ghim et al. | |
| 2018/0376383 A1* | 12/2018 | Belghoul | H04W 76/19 |
| 2019/0052328 A1 | 2/2019 | Akula et al. | |
| 2019/0053103 A1 | 2/2019 | Manolakos et al. | |
| 2019/0103949 A1 | 4/2019 | Harrison et al. | |
| 2019/0132896 A1 | 5/2019 | Kusashima et al. | |
| 2020/0033849 A1* | 1/2020 | Yiu | G05D 1/0607 |
| 2020/0274229 A1* | 8/2020 | Choi | H01Q 3/247 |
| 2021/0344364 A1* | 11/2021 | King | H04B 1/0057 |

OTHER PUBLICATIONS

Switching Beam Antenna for LTE Small Cell Application, Tang et al., IEEE Xplore (Year: 2017).*

QUALCOMM Incorporated: "UE Capability for Support of SRS Enhancements without Support of Comb 4", 3GPP TSG-RAN2 Meeting #100, R2-1712235, Nov. 27, 2017-Dec. 1, 2017, 43 pages.

SOFTBANK: "Clarification on Closed-Loop UE Tx Antenna Selection for UL CA", 3GPP TSG RAN WG1 Meeting #90, R1-1714181, Aug. 21-25, 2017, 3 pages.

Taiwan Search Report—108126938—TIPO—Aug. 14, 2022.

Huawei, et al., "High Layer Impacts on SRS Carrier Based Switching for LTE", 3GPP Draft; R2-166632 High Layer Impacts on SRS Carrier based Switching for LTE, 3rd Generation Partnership Project (3GPP), Mobile Competence Centre, 650, Route Des Lucioles, F-06921 Sophia-Antipolis, vol. RAN WG2, No. Kaohsiung; Oct. 10-Oct. 14, 2016, Oct. 9, 2016 (Oct. 9, 2016), 6 Pages, XP051151124, Retrieved from the Internet: URL: htlp://www.3gpp.org/ftp/Meetings_3GPP_SYNC/RAN2/Docs/ [retrieved on Oct. 9, 2016] section 2.2.6.

International Search Report and Written Opinion—PCT/US2019/044143—ISA/EPO—Oct. 9, 2019.

QUALCOMM Incorporated, et al., "UE Capabilities for TX Antenna selection", 3GPP TSG-RAN WG2 Meeting #100, 3GPP Draft, 36331_CR3081R2_(REL-14)_R2-1714240 Capabilities for TX Antenna Selection, 3rd Generation Partnership Project (3GPP), Mobile Competence Centre; 650, Route Des Lucioles; F-06921 Sophia-Antipolis, vol. RAN WG2, No. Reno, Nevada; Nov. 27-Dec. 1, 2017, Dec. 14, 2017 (Dec. 14, 2017), 48 Pages, XP051670707, Retrieved from the Internet: URL: http://www.3gpp.org/ftp/tsg%5Fran/TSG%5FRAN/TSGR%5F78/Docs/RP%2D172622%2Ezip [retrieved on Dec. 14, 2017] pp. 1-3, "Summary of Change" p. 42, "txAntennaSwitchDL, txAntennaSwitchUL".

QUALCOMM Incorporated: "Remaining Details on SRS", 3GPP Draft; R1-1718549, 3rd Generation Partnership Project (3GPP), Mobile Competence Centre; 650, Route Des Lucioles; F-06921 Sophia-Antipolis Cedex; France, vol. RAN WG1, No. Prague, CZ; Oct. 9-Oct. 13, 2017, Oct. 8, 2017, 9 Pages, XP051341730, Retrieved from the Internet: URL: http://www.3gpp.org/ftp/Meetings_3GPP_SYNC/RAN1/Docs/ [retrieved on Oct. 8, 2017].

QUALCOMM Incorporated: "Remaining Details on SRS," 3GPP Draft; R1-1720670 SRS, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 27-Dec. 1, 2017, Nov. 18, 2017, XP051370131, 7 Pages, Retrieved from the Internet URL: http://www.3gpp.org/ftp/tsg%5Fran/WG1%5FRL1/TSGR1%5F91/Docs/ [retrieved on Nov. 18, 2017] section 4, section 6.

* cited by examiner

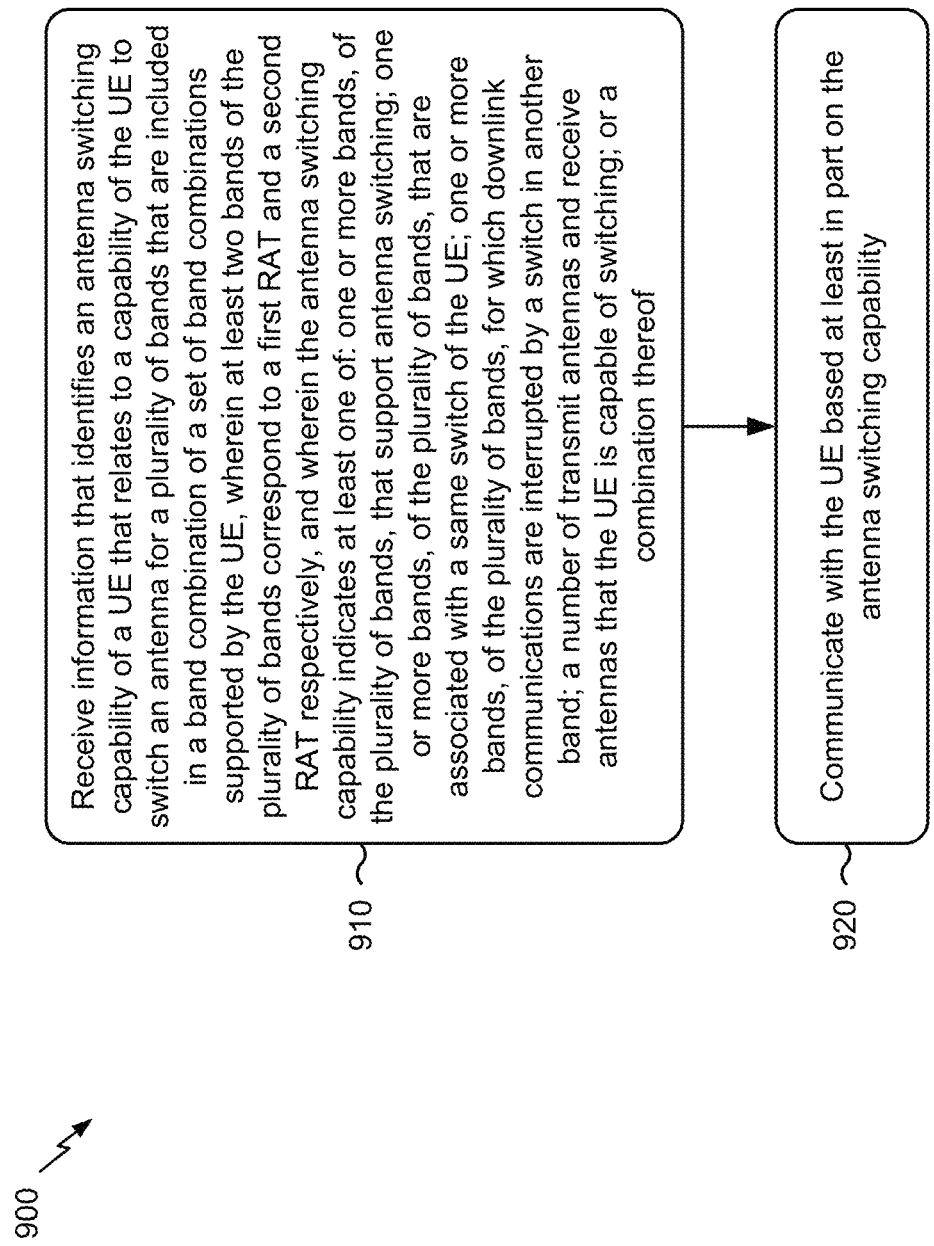

CARRIER SWITCHING AND ANTENNA SWITCHING FOR LONG TERM EVOLUTION AND NEW RADIO DUAL CONNECTIVITY

CROSS-REFERENCE TO RELATED APPLICATIONS UNDER 35 U.S.C. § 119

This application claims priority to U.S. Provisional Patent Application No. 62/711,992, filed on Jul. 30, 2018, entitled "CARRIER SWITCHING AND ANTENNA SWITCHING FOR LONG TERM EVOLUTION AND NEW RADIO DUAL CONNECTIVITY," which is hereby expressly incorporated by reference herein.

FIELD OF THE DISCLOSURE

Aspects of the present disclosure generally relate to wireless communication and to techniques and apparatuses for carrier switching and antenna switching for Long Term Evolution (LTE) and New Radio (NR) dual connectivity.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include determining an antenna switching capability for the UE that relates to a capability of the UE to switch an antenna for a plurality of bands that are included in a band combination of a set of band combinations supported by the UE, wherein at least two bands of the plurality of bands correspond to a first radio access technology (RAT) and a second RAT respectively; and signaling the set of band combinations and the antenna switching capability to a base station, wherein the antenna switching capability indicates at least one of: one or more bands, of the plurality of bands, that support antenna switching; one or more bands, of the plurality of bands, that are associated with a same switch of the UE; one or more bands, of the plurality of bands, for which downlink communications are interrupted by a switch in another band; a number of transmit antennas and receive antennas that the UE is capable of switching; or a combination thereof.

In some aspects, a method of wireless communication, performed by a base station, may include receiving information that identifies an antenna switching capability of a UE that relates to a capability of the UE to switch an antenna for a plurality of bands that are included in a band combination of a set of band combinations supported by the UE, wherein at least two bands of the plurality of bands correspond to a first RAT and a second RAT respectively, and wherein the antenna switching capability indicates at least one of: one or more bands, of the plurality of bands, that support antenna switching; one or more bands, of the plurality of bands, that are associated with a same switch of the UE; one or more bands, of the plurality of bands, for which downlink communications are interrupted by a switch in another band; a number of transmit antennas and receive antennas that the UE is capable of switching; or a combination thereof; and communicating with the UE based at least in part on the antenna switching capability.

In some aspects, a UE for wireless communication may include memory and one or more processors operatively coupled to the memory. The memory and the one or more processors may be configured to determine an antenna switching capability for the UE that relates to a capability of the UE to switch an antenna for a plurality of bands that are included in a band combination of a set of band combinations supported by the UE, wherein at least two bands of the plurality of bands correspond to a first RAT and a second RAT respectively; and signal the set of band combinations and the antenna switching capability to a base station, wherein the antenna switching capability indicates at least one of: one or more bands, of the plurality of bands, that support antenna switching; one or more bands, of the plurality of bands, that are associated with a same switch of the UE; one or more bands, of the plurality of bands, for which downlink communications are interrupted by a switch in another band; a number of transmit antennas and receive antennas that the UE is capable of switching; or a combination thereof.

In some aspects, a base station for wireless communication may include memory and one or more processors operatively coupled to the memory. The memory and the one or more processors may be configured to receive information that identifies an antenna switching capability of a UE that relates to a capability of the UE to switch an antenna for a plurality of bands that are included in a band combination of a set of band combinations supported by the UE, wherein at least two bands of the plurality of bands correspond to a first RAT and a second RAT respectively, and wherein the antenna switching capability indicates at least one of: one or more bands, of the plurality of bands, that support antenna switching; one or more bands, of the plurality of bands, that are associated with a same switch of the UE; one or more bands, of the plurality of bands, for which downlink communications are interrupted by a switch in another band; a number of transmit antennas and receive antennas that the UE is capable of switching; or a combination thereof; and communicate with the UE based at least in part on the antenna switching capability.

In some aspects, a non-transitory computer-readable medium may store one or more instructions for wireless communication. The one or more instructions, when executed by one or more processors of a UE, may cause the one or more processors to determine an antenna switching capability for the UE that relates to a capability of the UE to switch an antenna for a plurality of bands that are included in a band combination of a set of band combinations supported by the UE, wherein at least two bands of the plurality of bands correspond to a first RAT and a second RAT respectively; and signal the set of band combinations and the antenna switching capability to a base station, wherein the antenna switching capability indicates at least one of: one or more bands, of the plurality of bands, that support antenna switching; one or more bands, of the plurality of bands, that are associated with a same switch of the UE; one or more bands, of the plurality of bands, for which downlink communications are interrupted by a switch in another band; a number of transmit antennas and receive antennas that the UE is capable of switching; or a combination thereof.

In some aspects, a non-transitory computer-readable medium may store one or more instructions for wireless communication. The one or more instructions, when executed by one or more processors of a base station, may cause the one or more processors to receive information that identifies an antenna switching capability of a UE that relates to a capability of the UE to switch an antenna for a plurality of bands that are included in a band combination of a set of band combinations supported by the UE, wherein at least two bands of the plurality of bands correspond to a first RAT and a second RAT respectively, and wherein the antenna switching capability indicates at least one of: one or more bands, of the plurality of bands, that support antenna switching; one or more bands, of the plurality of bands, that are associated with a same switch of the UE; one or more bands, of the plurality of bands, for which downlink communications are interrupted by a switch in another band; a number of transmit antennas and receive antennas that the UE is capable of switching; or a combination thereof; and communicate with the UE based at least in part on the antenna switching capability.

In some aspects, a UE (e.g., an apparatus) for wireless communication may include means for determining an antenna switching capability for the UE that relates to a capability of the UE to switch an antenna for a plurality of bands that are included in a band combination of a set of band combinations supported by the UE, wherein at least two bands of the plurality of bands correspond to a first RAT and a second RAT respectively; and means for signaling the set of band combinations and the antenna switching capability to a base station, wherein the antenna switching capability indicates at least one of: one or more bands, of the plurality of bands, that support antenna switching; one or more bands, of the plurality of bands, that are associated with a same switch of the UE; one or more bands, of the plurality of bands, for which downlink communications are interrupted by a switch in another band; a number of transmit antennas and receive antennas that the UE is capable of switching; or a combination thereof.

In some aspects, a base station (e.g., an apparatus) for wireless communication may include means for receiving information that identifies an antenna switching capability of a UE that relates to a capability of the UE to switch an antenna for a plurality of bands that are included in a band combination of a set of band combinations supported by the UE, wherein at least two bands of the plurality of bands correspond to a first RAT and a second RAT respectively, and wherein the antenna switching capability indicates at least one of: one or more bands, of the plurality of bands, that support antenna switching; one or more bands, of the plurality of bands, that are associated with a same switch of the UE; one or more bands, of the plurality of bands, for which downlink communications are interrupted by a switch in another band; a number of transmit antennas and receive antennas that the UE is capable of switching; or a combination thereof; and means for communicating with the UE based at least in part on the antenna switching capability.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 6-9 are diagrams illustrating example processes relating to carrier switching and antenna switching for LTE and NR dual connectivity, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
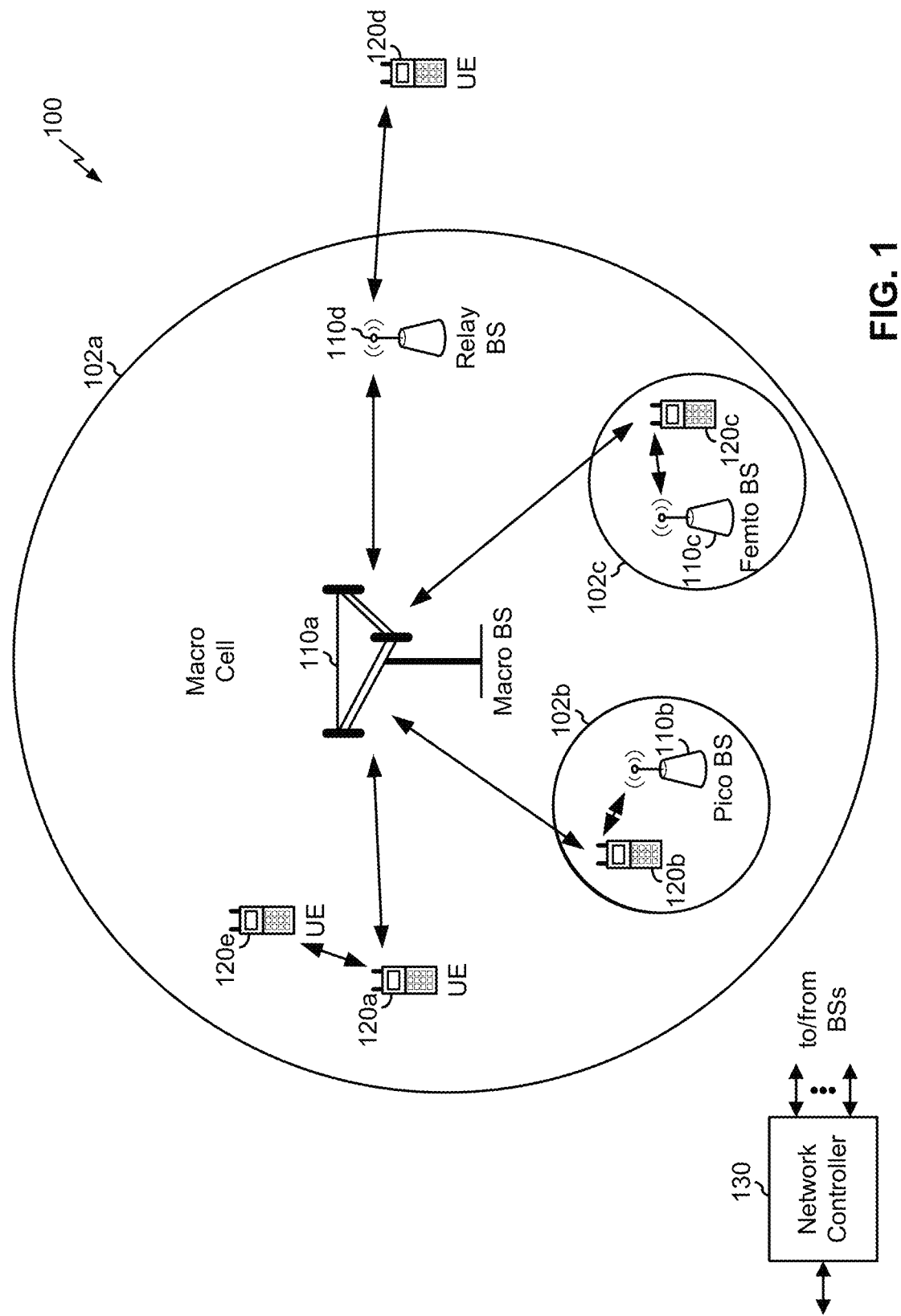
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
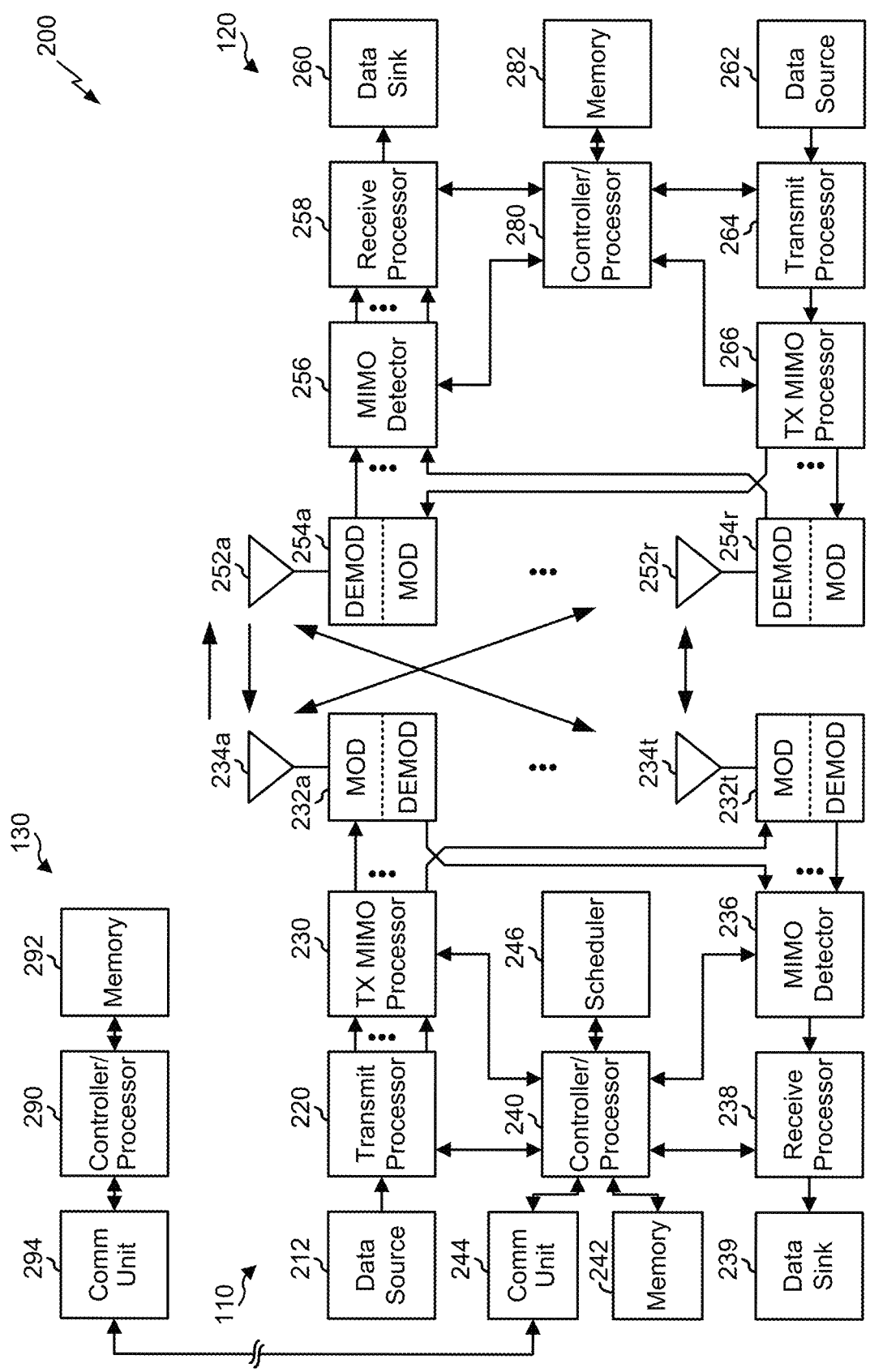
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing. As described below in connection with FIG. 3, UE 120 may include two or more transmit chains (e.g., two or more transmit processors 264, two or more TX MIMO processors 266, and/or the like).

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with carrier switching and antenna switching for LTE and NR dual connectivity, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, process 800 of FIG. 8, process 900 of FIG. 9, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for determining an antenna switching capability for the UE that relates to a capability of the UE to switch an antenna for a plurality of bands that are included in a band combination of a set of band combinations supported by the UE, wherein at least two bands of the plurality of bands correspond to a first RAT and a second RAT respectively; means for signaling the set of band combinations and the antenna switching capability to a base station, wherein the antenna switching capability indicates at least one of: one or more bands, of the plurality of bands, that support antenna switching; one or more bands, of the plurality of bands, that are associated with a same switch of the UE; one or more bands, of the plurality of bands, for which downlink communications are interrupted by a switch in another band; a number of transmit antennas and receive antennas that the UE is capable of switching; or a combination thereof; and/or the like. In some aspects, such means may include one or more components of UE 120 described in connection with FIG. 2. The UE 120 may include additional means for performing any of the UE methods, processes, steps, actions, and/or the like set forth herein.

In some aspects, base station 110 may include means for receiving information that identifies an antenna switching capability of a UE that relates to a capability of the UE to switch an antenna for a plurality of bands that are included in a band combination of a set of band combinations supported by the UE, wherein at least two bands of the plurality of bands correspond to a first RAT and a second RAT respectively, and wherein the antenna switching capability indicates at least one of: one or more bands, of the plurality of bands, that support antenna switching; one or more bands, of the plurality of bands, that are associated with a same switch of the UE; one or more bands, of the plurality of bands, for which downlink communications are interrupted by a switch in another band; a number of transmit antennas and receive antennas that the UE is capable of switching; or a combination thereof; means for communicating with the UE based at least in part on the antenna switching capability; and/or the like. In some aspects, such means may include one or more components of base station 110 described in connection with FIG. 2. The base station 110 may include additional means for performing any of the base station methods, processes, steps, actions, and/or the like set forth herein.

As indicated above, FIG. 2 is provided merely as an example. Other examples may differ from what is described with regard to FIG. 2.

Figure 3:
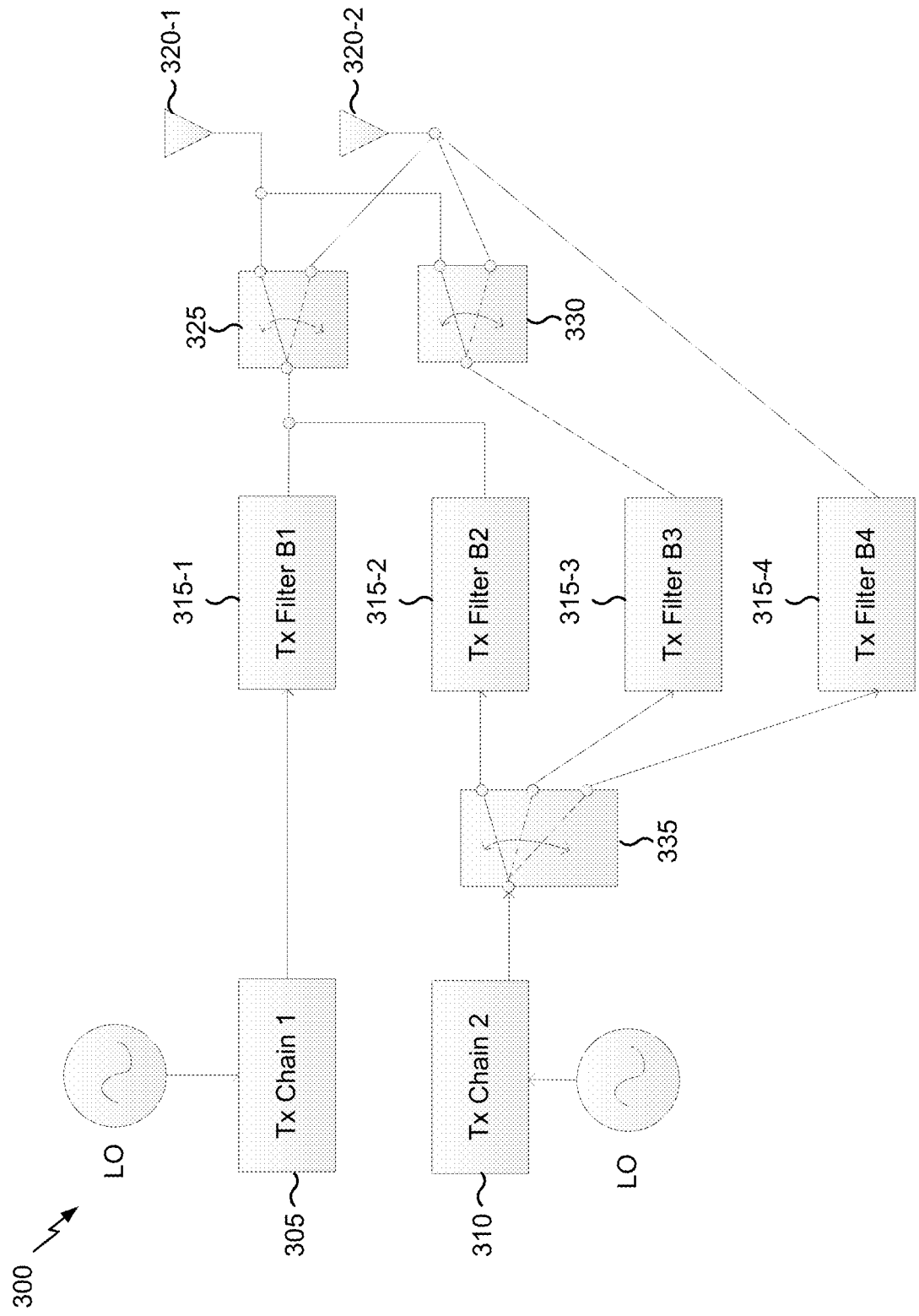
FIG. 3 is a diagram illustrating an example of a radio frequency architecture for a UE, in accordance with various aspects of the present disclosure.

FIG. 3 is a diagram illustrating an example 300 of a radio frequency architecture for a UE 120, in accordance with various aspects of the present disclosure.

As shown in FIG. 3, a UE (e.g., UE 120) may include two or more transmit chains, such as a first transmit chain 305 (shown as Tx Chain 1) and a second transmit chain 310 (shown as Tx Chain 2). As further shown, each transmit chain may be associated with a respective local oscillator (LO) and/or phased-locked loop (PLL). As further shown, the UE 120 may include respective transmit (Tx) filters 315-1 through 315-4, which may be associated with bands or carriers B1 through B4, respectively. The UE may transmit signals using antennas 320-1 and 320-2. As further shown, the UE may include switches 325, 330, and 335.

As shown, switch 325 may switch an input (e.g., from transmit filter 315-1 and/or 315-2) between antenna 320-1 and 320-2. Thus, the bands associated with transmit filters 315-1 and 315-2 (e.g., bands B1 and B2) may switch together, since both bands are controlled by the same switch 325. As further shown, switch 330 may switch an input (e.g., from transmit filter 315-3) between antenna 320-1 and antenna 320-2. As further shown, switch 335 may switch transmit chain 310 between transmit filters 315-2, 315-3, and 315-4. Notably, transmit filter 315-4 cannot switch from antenna 320-2, so transmit filter 315-4 can only be used with antenna 320-2.

Due to this radio frequency architecture, the supported band combinations for example 300 may include B1/B2 (since both can switch between antenna 320-1 and 320-2), B1/B3 (since B1 and B3 can switch separately between antenna 320-1 and 320-2), and B1/B4 (B1 can switch between antenna 320-1 and 320-2, and B4 cannot switch). Here, the band combinations include two bands because there are two transmit chains. In some aspects, the number of bands in a band combination may be equal to the number of transmit chains and/or the number of transmit antennas. The first transmit chain 305 may be dedicated to B1 and the second transmit chain 310 may be switched between B2, B3, and B4 by switch 335. Thus, the bands included in each band combination depend on a capability of the UE 120 to switch each transmit chain between the different bands and/or a capability of the UE 120 to switch each antenna between the different bands. In the case of B1/B4, the corresponding antenna switching capability may indicate that antenna switching is not supported for B4 and that antenna switching is supported for B1 between antennas 320-1 and 320-2. A carrier switching capability for example 300 might indicate uplink and/or downlink interruptions for switching between bands B2, B3, and B4 (e.g., due to the shared transmit chain 310).

In a time division duplex (TDD) multiple input multiple output (MIMO) communication system, a sounding reference signal (SRS) may be used for reciprocity-based beamforming. For example, the UE 120 may transmit an SRS in an uplink channel, and a base station 110 may receive the SRS. The base station 110 may use the SRS to estimate channel conditions of the uplink channel and may perform beamforming and/or precoding for a corresponding downlink channel using the estimated channel conditions of the uplink channel.

In many cases, the UE 120 may have more receive (Rx) resources than transmit (Tx) resources. For example, the UE 120 may have more Rx antennas (e.g., four) than Tx chains (e.g., two), so the UE 120 may be limited to transmitting uplink communications on one of the antennas. Additionally, or alternatively, the UE 120 may support more bands/carriers for downlink carrier aggregation (e.g., three) than Tx chains (e.g., one) of the UE 120, so the UE 120 may be limited to transmitting uplink communications in one of the bands. The asymmetry between Rx or downlink resources and Tx or uplink resources may limit reciprocity-based beamforming since the base station 110 cannot estimate all of the channels because the UE 120 can only transmit on some antennas and/or bands.

To assist with reciprocity-based beamforming, the UE 120 may be capable of switching Tx resources among different antennas and/or bands (e.g., carriers). For example, antenna switching may permit the UE 120 to transmit SRS from multiple antennas when the UE 120 has more Rx antennas than Tx chains. As another example, carrier switching may permit the UE 120 to retune a Tx chain from one carrier (e.g., band) to another carrier (e.g., band) to transmit SRS when the UE 120 supports more Rx carriers than Tx chains.

As illustrated by example 300 of FIG. 3, an antenna switching capability and/or a carrier switching capability of a UE 120 may depend on an RF architecture of the UE 120. Thus, different UEs 120 may have different antenna switching capabilities and/or carrier switching capabilities. To account for these differences, a UE 120 may signal an antenna switching capability and/or a carrier switching capability of the UE 120 to a base station 110, and the base station 110 may use such capabilities to communicate with the UE 120 (e.g., to schedule uplink communications, to schedule downlink communications, to receive reference signals, and/or the like).

Some wireless communications systems may support dual connectivity between a first radio access technology (RAT), such as LTE and/or the like, and a second RAT, such as NR and/or the like. For example, control information may be transmitted using the first RAT, and data may be transmitted using the first RAT and/or the second RAT (e.g., by aggregating a carrier of the second RAT with the first RAT), although other dual connectivity configurations are contemplated. Such dual connectivity may require that the RF architecture of the UE 120 be designed to support communications on both the first RAT and the second RAT, and/or to support aggregation of bands of the first RAT and the second RAT. Furthermore, an antenna switching capability and/or a carrier switching capability may need to account for dependencies between the first RAT and the second RAT. Some techniques and apparatuses described herein permit signaling of an antenna switching capability and/or a carrier switching capability that takes into account multiple RATs, such as in the case of LTE-NR dual connectivity. Additional details are described below.

As indicated above, FIG. 3 is provided as an example. Other examples differ from what is described with respect to FIG. 3. For example, other configurations of transmit chains, filters, switches, and/or antennas are contemplated. Thus, the radio frequency architecture of the UE 120 described herein is not limited to the architecture shown in FIG. 3.

Figure 4:
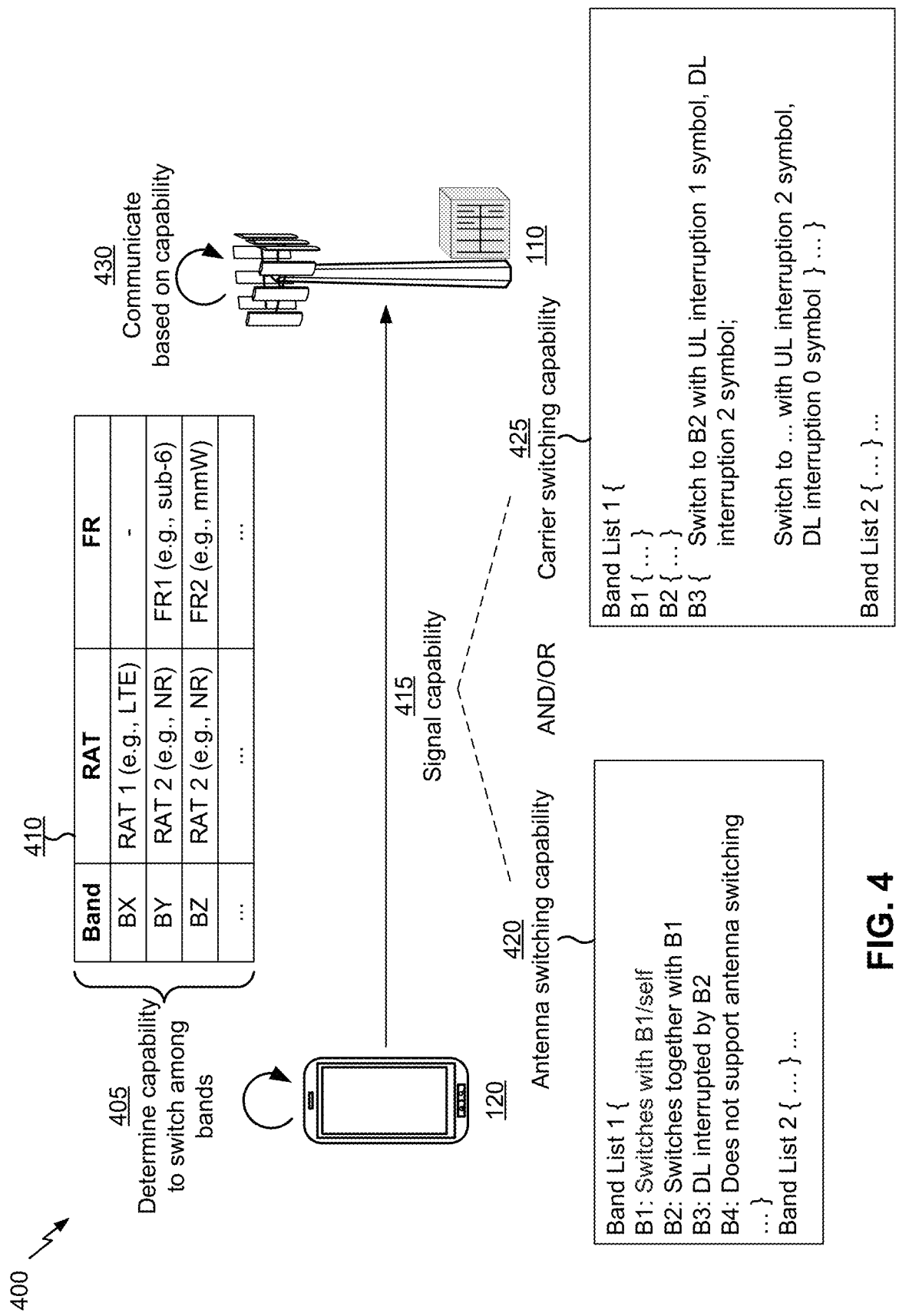
FIGS. 4 and 5 are diagrams illustrating examples of carrier switching and antenna switching for LTE and NR dual connectivity, in accordance with various aspects of the present disclosure.

FIG. 4 is a diagram illustrating an example 400 of carrier switching and antenna switching for LTE and NR dual connectivity, in accordance with various aspects of the present disclosure.

As shown by reference number 405, a UE 120 may determine a capability of the UE 120 to switch among a plurality of bands. For example, the UE 120 may determine an antenna switching capability of the UE 120 and/or a carrier switching capability of the UE 120. The antenna switching capability and/or the carrier switching capability may relate to a capability of the UE 120 to switch among the plurality of bands.

As shown by reference number 410, the plurality of bands may include at least one band of a first RAT and at least one band of a second RAT. For example, a first band, shown as BX, may be associated with a first RAT, such as an LTE RAT. As another example, a second band, shown as BY, and a third band, shown as BZ may be associated with a second RAT, such as an NR RAT. In some aspects, different bands may be associated with different frequency ranges (FRs) of a RAT. For example, the second band BY may be associated with a first frequency range (FR1) of the second RAT, such as a sub-6 GHz frequency range. Likewise, the third band BZ may be associated with a second frequency range (FR2) of the second RAT, such as a millimeter wave (mmW) frequency range. The number of bands and corresponding associations with RATs and frequency ranges are shown as an example, and a different number of bands and/or different associations are contemplated. In some aspects, the plurality of bands may be included in a band combination (e.g., a list of bands or a band list) signaled by the UE 120 to the base station 110, as described in more detail below.

As shown by reference number 415, the UE 120 may signal the antenna switching capability and/or the carrier switching capability to a base station 110. As described above in connection with FIG. 3, the antenna switching capability and/or the carrier switching capability may depend on an RF architecture of the UE 120, and the UE 120 may determine the antenna switching capability and/or the carrier switching capability based at least in part on the RF architecture. For example, a first subset of bands B1-B4 shown in FIG. 3 may be associated with the first RAT, and a second subset of bands B1-B4 shown in FIG. 3 may be associated with the second RAT (and/or one or more frequency ranges of the second RAT).

As shown by reference number 420, the UE 120 may signal the antenna switching capability to the base station 110. In some aspects, an antenna switching capability of the UE 120 may refer to a capability of the UE 120 to switch an antenna for one or more bands. As shown, the antenna switching capability may indicate one or more bands that support antenna switching, one or more bands that are associated with a same switch of the UE 120, one or more bands for which downlink communications are interrupted by a switch in another band, and/or the like. In example 400, for a first band combination (e.g., a first band list), the UE 120 indicates that a first band B1 supports antenna switching (e.g., is capable of switching between antennas, as shown by band B1 in FIG. 3), that a second band B2 switches together with the first band B1 (e.g., when the first band switches to a different antenna, the second band also switches to another antenna, as shown by bands B1 and B2 in FIG. 3), that a third band B3 experiences a downlink interruption by a switch in band B2, that a fourth band B4 does not support antenna switching (e.g., as shown in FIG. 3), and/or the like. These antenna switching capabilities are provided as an example, and other examples are contemplated.

Additionally, or alternatively, the antenna switching capability may indicate a number of Tx antennas and Rx antennas, of the UE 120, that the UE 120 is capable of switching. For example, the antenna switching capability may indicate that the UE 120 is capable of switching between 1 Tx antenna and 2 Rx antennas (1T2R), between 1 Tx antenna and 4 Rx antennas (1T4R), between 2 Tx antenna and 4 Rx antennas (2T4R), between 4 Tx antenna and 4 Rx antennas (4T4R), between an equal number of Tx antennas and Rx antennas (T=R), and/or the like. Additionally, or alternatively, the antenna switching capability may indicate that the UE 120 is not capable of switching between Tx and Rx antennas. Switching between Tx and Rx antennas may allow more flexible communication for the UE 120, such as to respond to changing traffic conditions (e.g., changing levels of uplink and downlink traffic).

In some aspects, the antenna switching capability may indicate a capability relating to the first RAT (e.g., an LTE RAT) and the second RAT (e.g., an NR RAT). For example, the antenna switching capability may indicate whether a first band, associated with the first RAT, and a second band, associated with the second RAT, are associated with a same switch of the UE 120 (e.g., whether the first band and the second band switch together, as shown by bands B1 and B2 in FIG. 3). Additionally, or alternatively, the antenna switching capability may indicate whether downlink communications of one of the first band or the second band are interrupted by a switch in the other of the first band or the second band.

In some aspects, if downlink communications of one of the first band (associated with the first RAT) or the second band (associated with second RAT) are interrupted by a switch in the other of the first band or the second band (e.g., because switching from a first band to a second band may prevent the UE 120 from communicating using the first band while tuned to the second band), then the UE 120 may modify one or more operations or calculations for the band that is interrupted by a switch in the other band. For example, the UE 120 may set log-likelihood ratio (LLR) values to zero for the interrupted band (e.g., during the interruption), may not store LLR values for the interrupted band (e.g., during the interruption), may reset one or more channel estimation loops (e.g., may reset information, stored in memory, that is combined over time to perform channel estimation), may skip channel state information reference signal (CSI-RS) measurements (e.g., during the interruption), may rest a radio resource management measurement filter, and/or the like. In some aspects, the UE 120 may skip measurements and/or calculations associated with interrupted time intervals (e.g., subframes, slots, symbols, and/or the like) of the interrupted band and/or may reset one or more loops (e.g., may reset information, stored in memory, that is combined over time to perform an operation for an interrupted band) for the interrupted band to avoid errors.

Additionally, or alternatively, the antenna switching capability may indicate one or more first values selected from a first set of values corresponding to the first RAT and one or more second values selected from a second set of values corresponding to the second RAT. The first set of values may be different from the second set of values. For example, LTE and NR may support different combinations of a number of Tx antennas and Rx antennas that the UE 120 is capable of switching. Thus, the UE 120 may select such capabilities from different sets for LTE and NR when reporting such capabilities. Additionally, or alternatively, the antenna switching capability may indicate one or more other capability relating to the first RAT and the second RAT, such as the capabilities described in more detail below in connection with FIG. 5.

As shown by reference number 425, the UE 120 may signal the carrier switching capability to the base station 110.

In some aspects, a carrier switching capability of the UE 120 may refer to a capability of the UE 120 to switch from one or more bands to a different band. As shown, the carrier switching capability may indicate an interruption time to at least one of an uplink operation or a downlink operation due to a switch from a source band, of the plurality of bands, to a target band of the plurality of bands. In example 400, a switch from band B3 to band B2 causes an uplink interruption of 1 symbol to band B2, and causes a downlink interruption of 2 symbols to band B3.

In some aspects, the source band is one of the first band of the first RAT or the second band of the second RAT, and the target band is the other of the first band of the first RAT or the second band of the second RAT. Thus, the UE 120 may indicate an interruption caused across RATs. Alternatively, the source band and the target band may be associated with a same RAT, and the carrier switching capability may not indicate inter-RAT interruption times (e.g., inter-RAT switching is prohibited).

In some aspects, the UE 120 may determine whether to switch from the source band to the target band based at least in part on a type of information to be transmitted in the source band and/or the target band. In some cases, the source band and the target band may belong to different RATs. For example, the UE 120 may prioritize transmission of a first type of information, such as hybrid automatic repeat request (HARQ) information (e.g., an acknowledgement (ACK), a negative acknowledgement (NACK), and/or the like), over a second type of information, such as a reference signal (e.g., an SRS). In this case, if the UE 120 is scheduled to transmit HARQ information on the source band, then the UE 120 may not switch to the target band to transmit an SRS. Additionally, or alternatively, the UE 120 may determine whether to transmit an SRS on a band (e.g., of one of the first RAT or the second RAT) based at least in part on a channel and/or signal on another band (e.g., of the other of the first RAT or the second RAT) that would be interrupted due to the SRS. For example, the UE 120 may determine not to transmit an SRS on a band if such transmission would interrupt the PUCCH on another band.

In some cases, signaling an interruption caused in a source band by a switch from the source band to a target band may not account for interruptions caused in other (e.g., non-source) bands due to the switch (e.g., due to reconfiguring the RF path in the RF architecture). To account for such interruptions in other bands, the carrier switching capability may indicate one or more bands that experience an interruption when an SRS is transmitted in a band without an uplink capability (e.g., a band without an uplink capability due to fewer Tx resources than Rx resources). The interruption may include an interruption to an uplink operation and/or downlink operation. In some aspects, an interruption to an uplink operation and a downlink operation may be signaled jointly (e.g., using 1 bit that indicates interruption or no interruption). In some aspects, an interruption to an uplink operation is signaled separately from an interruption to a downlink operation (e.g., using 2 bits that indicate interruption or no interruption for the uplink and interruption or no interruption for the downlink). Additionally, or alternatively, the carrier switching capability may indicate an interruption time for the downlink and/or the uplink.

As an example, the carrier switching capability may indicate an interruption to B1 of 2 symbols for the downlink and 2 symbols for the uplink when B3 transmits an SRS, may indicate an interruption to B2 of 1 symbol for the downlink and 1 symbol for the uplink when B3 transmits an SRS, may indicate no interruption to B1 in the downlink or uplink when B4 transmits an SRS, may indicate no interruption to B2 in the downlink and an interruption to B2 of 2 symbols for the uplink when B4 transmits an SRS, and/or the like. In this case, B1 and B2 may have an uplink capability, and B3 and B4 may not have an uplink capability, but may be capable of SRS carrier switching (e.g., to permit reciprocity-based beamforming).

In some aspects, the antenna switching capability and/or the carrier switching capability may indicate a switching time and/or an interruption time. In some aspects, such time(s) may be indicated using a configured granularity (e.g., indicated by the base station 110, such as in a radio resource control (RRS) message and/or the like) or a predefined granularity (e.g., according to a standard). For example, the granularity may be a symbol duration for a subcarrier spacing of 15 kHz and/or the like.

Additionally, or alternatively, the antenna switching capability and/or the carrier switching capability may indicate a number of concurrent intra-RAT switches supported by the UE 120 (e.g., LTE to LTE switches or NR to NR switches), a number of concurrent inter-RAT switches supported by the UE 120 (e.g., LTE to NR switches or NR to LTE switches), and/or the like. In some aspects, the UE 120 may signal a number of concurrent intra-RAT switches supported by the UE 120 for each of the first RAT (e.g., LTE to LTE switches) and the second RAT (e.g., NR to NR switches). In some aspects, this capability may depend on an RF architecture of the UE 120, such as a speed of data communication between UE components that support the first RAT (e.g., LTE components) and UE components that support the second RAT (e.g., NR components).

In some aspects, one or more switching configurations of the UE 120 may be prohibited (e.g., according to a preconfigured or predefined configuration). For example, a switch that causes an interruption to a particular physical channel (e.g., PDCCH and/or the like), a particular subframe of a particular channel (e.g., subframe 5 of PDCCH used for paging and SIBs) and/or a particular signal (e.g., a page, a SIB, a particular reference signal, and/or the like) may be prohibited. In this way, interruptions of high priority channels and/or signals may be avoided.

As shown by reference number 430, the base station 110 may receive, from the UE 120, information that identifies the antenna switching capability and/or the carrier switching capability, and may communicate with the UE 120 based at least in part on the antenna switching capability and/or the carrier switching capability. For example, the base station 110 may schedule communications for the UE 120 based at least in part on the capabilities, may transmit communications to the UE 120 based at least in part on the capabilities, may monitor for reference signals (SRS) from the UE 120 based at least in part on the capabilities, and/or the like.

In some aspects, the base station 110 may avoid scheduling communications that the UE 120 is unable to transmit or receive (e.g., due to an incompatibility between bands, an interruption caused by a switch, and/or the like). Thus, by signaling an antenna switching capability and/or a carrier switching capability for bands of different RATs, errors in communications between the UE 120 and the base station 110 may be reduced.

As indicated above, FIG. 4 is provided as an example. Other examples may differ from what is described with respect to FIG. 4.

Figure 5:
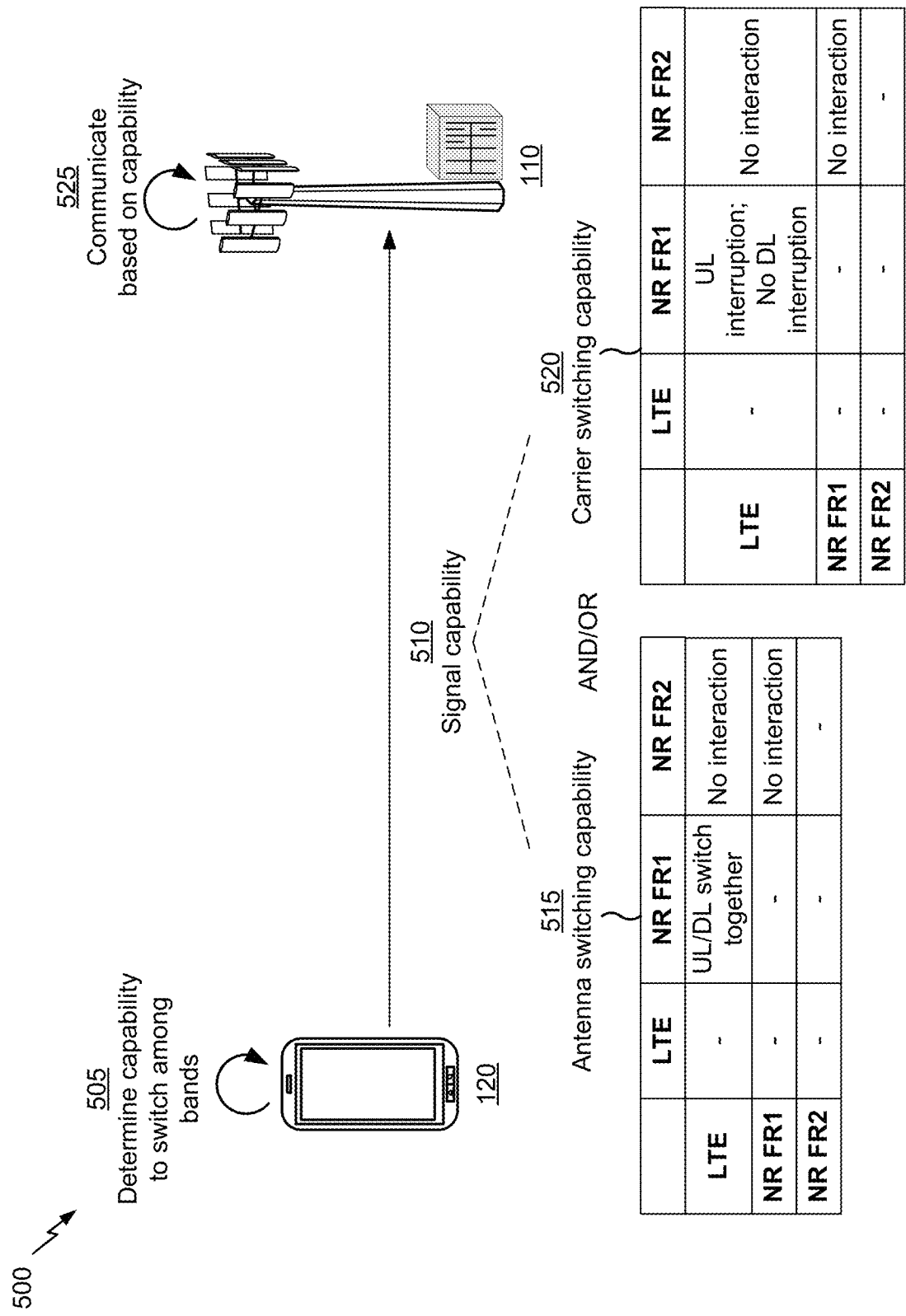

FIG. 5 is a diagram illustrating another example 500 of carrier switching and antenna switching for LTE and NR dual connectivity, in accordance with various aspects of the present disclosure.

As shown by reference number 505, a UE 120 may determine a capability of the UE 120 to switch among a plurality of bands, as described above in connection with FIG. 4. For example, the UE 120 may determine an antenna switching capability of the UE 120 and/or a carrier switching capability of the UE 120. The antenna switching capability and/or the carrier switching capability may relate to a capability of the UE 120 to switch among the plurality of bands. The plurality of bands may include at least one band of a first RAT and at least one band of a second RAT.

As shown by reference number 510, the UE 120 may signal the antenna switching capability and/or the carrier switching capability to a base station 110, as described above in connection with FIG. 4.

As shown by reference number 515, the UE 120 may signal the antenna switching capability to the base station 110, as described above in connection with FIG. 4. In some aspects, an antenna switching capability of the UE 120 may refer to a capability of the UE 120 to switch an antenna for one or more bands and/or one or more RATs. For example, a band may be associated with a RAT, and the UE 120 may signal a capability of the UE 120 to switch an antenna for a RAT (e.g., for one or more bands of the RAT, for all bands associated with the RAT, and/or the like).

In some aspects, the antenna switching capability may indicate whether an antenna switch in one RAT, of the first RAT or the second RAT, affects an operation on the other RAT of the first RAT or the second RAT. For example, the antenna switching capability may indicate whether a switch in LTE affects an operation in NR, and/or whether a switch in NR affects an operation in LTE.

Additionally, or alternatively, as shown, the antenna switching capability may indicate whether an antenna switch in at least one of the first RAT (e.g., an LTE RAT), a first frequency range (FR1) of the second RAT (e.g., a sub-6 GHz frequency range of an NR RAT), or a second frequency range (FR2) of the second RAT (e.g., a millimeter wave frequency range of an NR RAT) affects an operation on another one of the first RAT, the first frequency range, or the second frequency range. In this way, signaling may be simplified as compared to indicating antenna switching effects per band.

In some aspects, the antenna switching capability may indicate the affected operation. For example, the affected operation may include an uplink operation, a downlink operation, and/or the like. In some aspects, the uplink operation may be affected if the UE 120 uses a same antenna or antenna port for the first RAT and the second RAT, the first RAT and the first frequency range of the second RAT, the first RAT and the second frequency range of the second RAT, the first frequency range and the second frequency range, and/or the like.

In some aspects, an interruption to an uplink operation and a downlink operation may be signaled jointly (e.g., using 1 bit or 1 field that indicates an interruption to both uplink and downlink or no interruption to either uplink nor downlink). In some aspects, an interruption to an uplink operation may be signaled separately from an interruption to a downlink operation (e.g., using 2 bits or 2 fields that indicate an interruption or no interruption for the uplink and an interruption or no interruption for the downlink).

In example 500, the UE 120 uses joint signaling to indicate that the LTE RAT and FR1 of the NR RAT switch together on both the uplink and the downlink (e.g., LTE RF components and NR FR1 RF components, such as Tx filters, are connected to a same switch). Furthermore, the UE 120 indicates that LTE and NR FR2 do not cause an interruption to one another when an antenna is switched in either of LTE or NR FR2, and that NR FR1 and NR FR2 do not cause an interruption to one another when an antenna is switched in either of NR FR1 or NR FR2.

In some aspects, the base station 110 may be configured with an indication that antenna switching in NR FR2 does not cause an interruption in LTE and/or NR FR1, and that antenna switching in LTE and/or NR FR1 does not cause an interruption in NR FR2. This may be due to RF architectures of the UE 120 that require NR FR2 to have a separate RF path and/or RF components due to the differences between millimeter wave RF processing and sub-6 GHz RF processing. In this case, the antenna switching capability need not indicate interactions between NR FR2 and NR FR1 and/or between NR FR2 and LTE. Thus, in some aspects, the antenna switching capability indicates whether an antenna switch in one of the LTE RAT or the sub-6 GHz frequency range affects the other one of the LTE RAT or the sub-6 GHz frequency range without indicating whether an antenna switch in the millimeter wave band affects the LTE RAT or the sub-6 GHz frequency range.

As shown by reference number 520, the UE 120 may signal the carrier switching capability to the base station 110, as described above in connection with FIG. 4. In some aspects, a carrier switching capability of the UE 120 may refer to a capability of the UE 120 to switch from one or more bands and/or RATs (e.g., of one of the first RAT or the second RAT) to a different band and/or RAT (e.g., of the other one of the first RAT or the second RAT). For example, a band may be associated with a RAT, and the UE 120 may signal a capability of the UE 120 to switch from a band of one RAT to a band of another RAT.

In some aspects, the carrier switching capability may indicate whether a carrier switch to one of the first RAT or the second RAT affects an operation on the other of the first RAT or the second RAT. For example, the carrier switching capability may indicate whether a switch to LTE affects an operation in NR, and/or whether a switch to NR affects an operation in LTE.

Additionally, or alternatively, as shown, the carrier switching capability may indicate whether a carrier switch to at least one of the first RAT (e.g., an LTE RAT), a first frequency range (FR1) of the second RAT (e.g., a sub-6 GHz frequency range of an NR RAT), or a second frequency range (FR2) of the second RAT (e.g., a millimeter wave frequency range of an NR RAT) affects an operation on another one of the first RAT, the first frequency range, or the second frequency range. In this way, signaling may be simplified as compared to indicating carrier switching effects per band.

In some aspects, the carrier switching capability may indicate the affected operation. For example, the affected operation may include an uplink operation, a downlink operation, and/or the like. In some aspects, an interruption to an uplink operation and a downlink operation may be signaled jointly (e.g., using 1 bit or 1 field that indicates an interruption to both uplink and downlink or no interruption to either uplink nor downlink). In some aspects, an interruption to an uplink operation may be signaled separately from an interruption to a downlink operation (e.g., using 2 bits or 2 fields that indicate an interruption or no interruption for the uplink and an interruption or no interruption for the downlink). Additionally, or alternatively, the carrier switching capability may indicate an interruption time for the downlink and/or the uplink.

In example 500, the UE 120 uses separate signaling to indicate that a carrier switch to LTE causes an uplink interruption but not a downlink interruption to NR FR1, and that a carrier switch to NR FR1 causes an uplink interruption but not a downlink interruption to LTE. Furthermore, the UE 120 indicates that LTE and NR FR2 do not cause an interruption to one another when a carrier is switched to either of LTE or NR FR2, and that NR FR1 and NR FR2 do not cause an interruption to one another when a carrier is switched to either of NR FR1 or NR FR2.

In some aspects, the base station 110 may be configured with an indication that carrier switching to NR FR2 does not cause an interruption in LTE and/or NR FR1, and that carrier switching to LTE and/or NR FR1 does not cause an interruption in NR FR2, in a similar manner as described above in connection with FIG. 4. In this case, the carrier switching capability need not indicate interactions between NR FR2 and NR FR1 and/or between NR FR2 and LTE. Thus, in some aspects, the carrier switching capability indicates whether a carrier switch to one of the LTE RAT or the sub-6 GHz frequency range affects the other one of the LTE RAT or the sub-6 GHz frequency range without indicating whether a carrier switch to the millimeter wave band affects the LTE RAT or the sub-6 GHz frequency range.

As shown by reference number 525, the base station 110 may receive, from the UE 120, information that identifies the antenna switching capability and/or the carrier switching capability, and may communicate with the UE 120 based at least in part on the antenna switching capability and/or the carrier switching capability, as described above in connection with FIG. 4. By signaling an antenna switching capability and/or a carrier switching capability between RATs and/or frequency ranges of RATs, signaling may be simplified as compared to indicating an antenna switching capability and/or a carrier switching capability between bands (e.g., bands in band combinations). As a result, less overhead (e.g., fewer network resources) may be used to signal the antenna switching capability and/or the carrier switching capability, the UE 120 may use fewer UE resources (e.g., memory, processing power, battery power, and/or the like) to prepare the capabilities to be signaled, the base station 110 may use fewer base station resources (e.g., memory, processing power, battery power, and/or the like) to process the capabilities, and/or the like.

In some aspects, a combination of per-band antenna switching capabilities and/or carrier switching capabilities (e.g., as described in connection with FIG. 4) and per-RAT and/or per-FR antenna switching capabilities and/or carrier switching capabilities (e.g., as described in connection with FIG. 5) may be signaled to provide greater flexibility in capability signaling.

As indicated above, FIG. 5 is provided as an example. Other examples may differ from what is described with respect to FIG. 5.

Figure 6:
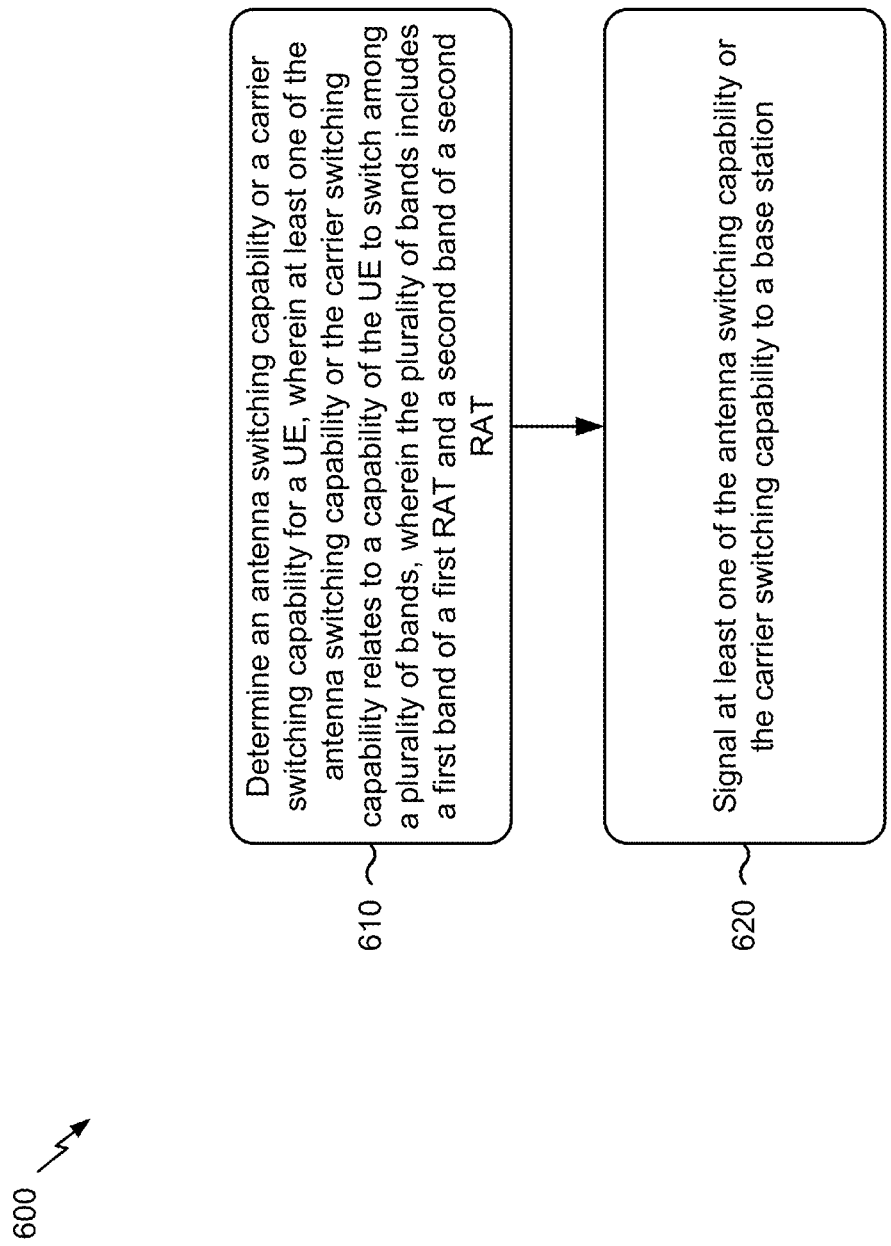

FIG. 6 is a diagram illustrating an example process 600 performed, for example, by a UE, in accordance with various aspects of the present disclosure. Example process 600 is an example where a UE (e.g., UE 120 and/or the like) performs operations associated with carrier switching and antenna switching for LTE and NR dual connectivity.

As shown in FIG. 6, in some aspects, process 600 may include determining an antenna switching capability or a carrier switching capability for the UE, wherein at least one of the antenna switching capability or the carrier switching capability relates to a capability of the UE to switch among a plurality of bands, wherein the plurality of bands includes a first band of a first RAT and a second band of a second RAT (block 610). For example, the UE (e.g., using controller/processor 280 and/or the like) may determine an antenna switching capability or a carrier switching capability for the UE, as described above in connection with FIGS. 3-5. In some aspects, at least one of the antenna switching capability or the carrier switching capability relates to a capability of the UE to switch among a plurality of bands. In some aspects, the plurality of bands includes a first band of a first RAT and a second band of a second RAT.

As further shown in FIG. 6, in some aspects, process 600 may include signaling at least one of the antenna switching capability or the carrier switching capability to a base station (block 620). For example, the UE (e.g., using controller/processor 280, transmit processor 264, TX MIMO processor 266, MOD 254, antenna 252, and/or the like) may signal at least one of the antenna switching capability or the carrier switching capability to a base station, as described above in connection with FIGS. 3-5.

Process 600 may include additional aspects, such as any single aspect or any combination of aspects described below and/or in connection with one or more other processes described elsewhere herein.

In a first aspect, the plurality of bands are included in a band combination signaled by the UE to the base station.

In a second aspect, alone or in combination with the first aspect, the capability of the UE to switch among the plurality of bands includes a capability to switch an antenna for one or more bands and/or a capability to switch from one or more bands to a different band.

In a third aspect, alone or in combination with one or more of the first and second aspects, the antenna switching capability indicates at least one of: one or more bands, of the plurality of bands, that support antenna switching; one or more bands, of the plurality of bands, that are associated with a same switch of the UE; one or more bands, of the plurality of bands, for which downlink communications are interrupted by a switch in another band; a number of transmit antennas and receive antennas that the UE is capable of switching; or a combination thereof.

In a fourth aspect, alone or in combination with one or more of the first through third aspects, the antenna switching capability indicates whether the first band and the second band are associated with a same switch of the UE.

In a fifth aspect, alone or in combination with one or more of the first through fourth aspects, the antenna switching capability indicates whether downlink communications of one of the first band or the second band are interrupted by a switch in the other of the first band or the second band.

In a sixth aspect, alone or in combination with one or more of the first through fifth aspects, one or more operations or calculations for one band, of the first band or the second band, are modified based at least in part on a determination that the one band is interrupted by a switch in the other band of the first band or the second band.

In a seventh aspect, alone or in combination with one or more of the first through sixth aspects, the antenna switching capability indicates one or more first values selected from a first set of values corresponding to the first RAT and one or more second values selected from a second set of values corresponding to the second RAT, wherein the first set of values is different from the second set of values.

In an eighth aspect, alone or in combination with one or more of the first through seventh aspects, the antenna switching capability indicates at least one of: whether an antenna switch in one RAT, of the first RAT or the second RAT, affects a first operation on the other RAT of the first RAT or the second RAT, or whether an antenna switch in at least one of the first RAT, a first frequency range of the second RAT, or a second frequency range of the second RAT affects a second operation on another one of the first RAT, the first frequency range, or the second frequency range.

In a ninth aspect, alone or in combination with one or more of the first through eighth aspects, the first operation or the second operation includes at least one of an uplink operation or a downlink operation.

In a tenth aspect, alone or in combination with one or more of the first through ninth aspects, affecting the uplink operation comprises using a same antenna or antenna port for at least one of: the first RAT and the second RAT, or the first frequency range and the second frequency range.

In an eleventh aspect, alone or in combination with one or more of the first through tenth aspects, an interruption to the uplink operation is signaled jointly with an interruption to the downlink operation.

In a twelfth aspect, alone or in combination with one or more of the first through eleventh aspects, an interruption to the uplink operation is signaled separately from an interruption to the downlink operation.

In a thirteenth aspect, alone or in combination with one or more of the first through twelfth aspects, the first RAT is a Long Term Evolution (LTE) RAT and the second RAT is a New Radio (NR) RAT having a sub-6 GHz frequency range and a millimeter wave frequency range.

In a fourteenth aspect, alone or in combination with one or more of the first through thirteenth aspects, the antenna switching capability indicates whether an antenna switch to one of the LTE RAT or the sub-6 GHz frequency range affects the other one of the LTE RAT or the sub-6 GHz frequency range without indicating whether an antenna switch to the millimeter wave band affects the LTE RAT or the sub-6 GHz frequency range.

In a fifteenth aspect, alone or in combination with one or more of the first through fourteenth aspects, the carrier switching capability indicates an interruption time to at least one of an uplink operation or a downlink operation due to a switch from a source band, of the plurality of bands, to a target band of the plurality of bands.

In a sixteenth aspect, alone or in combination with one or more of the first through fifteenth aspects, the source band is one of the first band of the first RAT or the second band of the second RAT, and the target band is the other of the first band of the first RAT or the second band of the second RAT.

In a seventeenth aspect, alone or in combination with one or more of the first through sixteenth aspects, the UE may determine whether to switch from the source band to the target band based at least in part on a type of information to be transmitted in at least one of the source band or the target band.

In an eighteenth aspect, alone or in combination with one or more of the first through seventeenth aspects, the source band and the target band are associated with different RATs.

In a nineteenth aspect, alone or in combination with one or more of the first through eighteenth aspects, the source band and the target band are associated with a same RAT, and the carrier switching capability does not indicate inter-RAT interruption times.

In a twentieth aspect, alone or in combination with one or more of the first through nineteenth aspects, the carrier switching capability indicates one or more bands, of the plurality of bands, that experience an interruption when a sounding reference signal (SRS) is transmitted in a band, of the plurality of bands, without an uplink capability.

In a twenty-first aspect, alone or in combination with one or more of the first through twentieth aspects, the interruption includes at least one of an interruption to an uplink operation or an interruption to a downlink operation.

In a twenty-second aspect, alone or in combination with one or more of the first through twenty-first aspects, the interruption to the uplink operation is signaled jointly with the interruption to the downlink operation.

In a twenty-third aspect, alone or in combination with one or more of the first through twenty-second aspects, the interruption to the uplink operation is signaled separately from the interruption to the downlink operation.

In a twenty-fourth aspect, alone or in combination with one or more of the first through twenty-third aspects, the carrier switching capability indicates at least one of: whether a carrier switch to one of the first RAT or the second RAT affects a first operation on the other of the first RAT or the second RAT, or whether a carrier switch to at least one of the first RAT, a first frequency range of the second RAT, or a second frequency range of the second RAT affects a second operation on another one of the first RAT, the first frequency range, or the second frequency range.

In a twenty-fifth aspect, alone or in combination with one or more of the first through twenty-fourth aspects, the first operation or the second operation includes at least one of an uplink operation or a downlink operation.

In a twenty-sixth aspect, alone or in combination with one or more of the first through twenty-fifth aspects, an interruption to the uplink operation is signaled jointly with an interruption to the downlink operation.

In a twenty-seventh aspect, alone or in combination with one or more of the first through twenty-sixth aspects, an interruption to the uplink operation is signaled separately from an interruption to the downlink operation.

In a twenty-eighth aspect, alone or in combination with one or more of the first through twenty-seventh aspects, the first RAT is a Long Term Evolution (LTE) RAT and the second RAT is a New Radio (NR) RAT having a sub-6 GHz frequency range and a millimeter wave frequency range.

In a twenty-ninth aspect, alone or in combination with one or more of the first through twenty-eighth aspects, the carrier switching capability indicates whether a carrier switch to one of the LTE RAT or the sub-6 GHz frequency range affects the other one of the LTE RAT or the sub-6 GHz frequency range without indicating whether a carrier switch to the millimeter wave band affects the LTE RAT or the sub-6 GHz frequency range.

In a thirtieth aspect, alone or in combination with one or more of the first through twenty-ninth aspects, at least one of the antenna switching capability or the carrier switching capability indicates a switching time or an interruption time, wherein the switching time or the interruption time is indicated using a configured or predefined granularity.

In a thirty-first aspect, alone or in combination with one or more of the first through thirtieth aspects, the granularity is a symbol duration for a subcarrier spacing of 15 kilohertz.

In a thirty-second aspect, alone or in combination with one or more of the first through thirty-first aspects, at least one of the antenna switching capability or the carrier switching capability indicates at least one of: a number of concurrent intra-RAT switches supported by the UE, a number of concurrent inter-RAT switches supported by the UE, or a combination thereof.

In a thirty-third aspect, alone or in combination with one or more of the first through thirty-second aspects, the UE is configured to signal a number of concurrent intra-RAT switches supported by the UE for each of the first RAT and the second RAT.

In a thirty-fourth aspect, alone or in combination with one or more of the first through thirty-third aspects, one or more switching configurations are prohibited.

In a thirty-fifth aspect, alone or in combination with one or more of the first through thirty-fourth aspects, the one or more switching configurations are prohibited based at least on an interruption created by switching a band in one of the first RAT or the second RAT, wherein the interruption affects a physical channel or signal in the other of the first band of the first RAT or the second band of the second RAT.

In a thirty-sixth aspect, alone or in combination with one or more of the first through thirty-fifth aspects, a determination of whether to transmit a sounding reference signal on a band, of the plurality of bands, is based at least in part on a channel that would be interrupted due to the SRS.

In a thirty-seventh aspect, alone or in combination with one or more of the first through thirty-sixth aspects, the sounding reference signal is associated with one of the first RAT or the second RAT, and wherein the channel is associated with the other of the first RAT or the second RAT.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
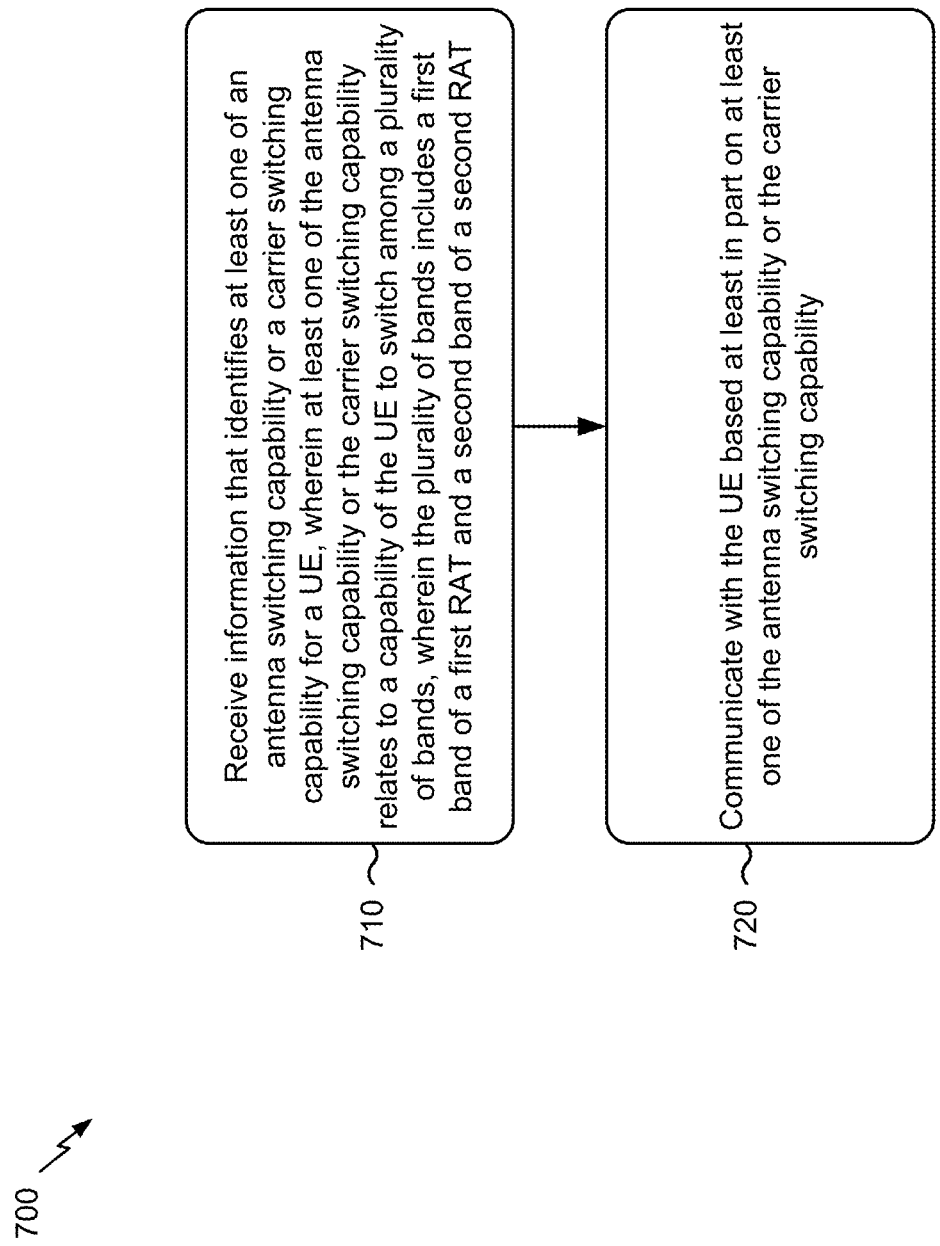

FIG. 7 is a diagram illustrating an example process 700 performed, for example, by a base station, in accordance with various aspects of the present disclosure. Example process 700 is an example where a base station (e.g., base station 110 and/or the like) performs operations associated with carrier switching and antenna switching for LTE and NR dual connectivity.

As shown in FIG. 7, in some aspects, process 700 may include receiving information that identifies at least one of an antenna switching capability or a carrier switching capability for a UE, wherein at least one of the antenna switching capability or the carrier switching capability relates to a capability of the UE to switch among a plurality of bands, wherein the plurality of bands includes a first band of a first RAT and a second band of a second RAT (block 710). For example, the base station (e.g., using antenna 234, DEMOD 232, MIMO detector 236, receive processor 238, controller/processor 240, and/or the like) may receive information that identifies at least one of an antenna switching capability or a carrier switching capability for a UE, as described above in connection with FIGS. 3-5. In some aspects, at least one of the antenna switching capability or the carrier switching capability relates to a capability of the UE to switch among a plurality of bands. In some aspects, the plurality of bands includes a first band of a first RAT and a second band of a second RAT.

As further shown in FIG. 7, in some aspects, process 700 may include communicating with the UE based at least in part on at least one of the antenna switching capability or the carrier switching capability (block 720). For example, the base station (e.g., using transmit processor 220, TX MIMO processor 230, MOD 232 using antenna 234, DEMOD 232, MIMO detector 236, receive processor 238, controller/processor 240, and/or the like) may communicate with the UE based at least in part on at least one of the antenna switching capability or the carrier switching capability, as described above in connection with FIGS. 3-5.

Process 700 may include additional aspects, such as any single aspect or any combination of aspects described below and/or in connection with one or more other processes described elsewhere herein.

In a first aspect, the plurality of bands are included in a band combination signaled by the UE to the base station.

In a second aspect, alone or in combination with the first aspect, the capability of the UE to switch among the plurality of bands includes a capability to switch an antenna for one or more bands or a capability to switch from one or more bands to a different band.

In a third aspect, alone or in combination with one or more of the first and second aspects, the antenna switching capability indicates at least one of: one or more bands, of the plurality of bands, that support antenna switching; one or more bands, of the plurality of bands, that are associated with a same switch of the UE; one or more bands, of the plurality of bands, for which downlink communications are interrupted by a switch in another band; a number of transmit antennas and receive antennas that the UE is capable of switching; or a combination thereof.

In a fourth aspect, alone or in combination with one or more of the first through third aspects, the antenna switching capability indicates whether the first band and the second band are associated with a same switch of the UE.

In a fifth aspect, alone or in combination with one or more of the first through fourth aspects, the antenna switching capability indicates whether downlink communications of one of the first band or the second band are interrupted by a switch in the other of the first band or the second band.

In a sixth aspect, alone or in combination with one or more of the first through fifth aspects, the antenna switching capability indicates one or more first values selected from a first set of values corresponding to the first RAT and one or more second values selected from a second set of values corresponding to the second RAT, wherein the first set of values is different from the second set of values.

In a seventh aspect, alone or in combination with one or more of the first through sixth aspects, the antenna switching capability indicates at least one of: whether an antenna switch in one RAT, of the first RAT or the second RAT, affects a first operation on the other RAT of the first RAT or the second RAT, or whether an antenna switch in at least one of the first RAT, a first frequency range of the second RAT, or a second frequency range of the second RAT affects a second operation on another one of the first RAT, the first frequency range, or the second frequency range.

In an eighth aspect, alone or in combination with one or more of the first through seventh aspects, the first operation or the second operation includes at least one of an uplink operation or a downlink operation.

In a ninth aspect, alone or in combination with one or more of the first through eighth aspects, affecting the uplink operation comprises using a same antenna or antenna port for at least one of: the first RAT and the second RAT, or the first frequency range and the second frequency range.

In a tenth aspect, alone or in combination with one or more of the first through ninth aspects, an interruption to the uplink operation is signaled jointly with an interruption to the downlink operation.

In an eleventh aspect, alone or in combination with one or more of the first through tenth aspects, an interruption to the uplink operation is signaled separately from an interruption to the downlink operation.

In a twelfth aspect, alone or in combination with one or more of the first through eleventh aspects, the first RAT is a Long Term Evolution (LTE) RAT and the second RAT is a New Radio (NR) RAT having a sub-6 GHz frequency range and a millimeter wave frequency range.

In a thirteenth aspect, alone or in combination with one or more of the first through twelfth aspects, the antenna switching capability indicates whether an antenna switch in one of the LTE RAT or the sub-6 GHz frequency range affects the other one of the LTE RAT or the sub-6 GHz frequency range without indicating whether an antenna switch in the millimeter wave band affects the LTE RAT or the sub-6 GHz frequency range.

In a fourteenth aspect, alone or in combination with one or more of the first through thirteenth aspects, the carrier switching capability indicates an interruption time to at least one of an uplink operation or a downlink operation due to a switch from a source band, of the plurality of bands, to a target band of the plurality of bands.

In a fifteenth aspect, alone or in combination with one or more of the first through fourteenth aspects, the source band is one of the first band of the first RAT or the second band of the second RAT, and the target band is the other of the first band of the first RAT or the second band of the second RAT.

In a sixteenth aspect, alone or in combination with one or more of the first through fifteenth aspects, the source band and the target band are associated with a same RAT, and the carrier switching capability does not indicate inter-RAT interruption times.

In a seventeenth aspect, alone or in combination with one or more of the first through sixteenth aspects, the carrier switching capability indicates one or more bands, of the plurality of bands, that experience an interruption when a sounding reference signal (SRS) is transmitted in a band, of the plurality of bands, without an uplink capability.

In an eighteenth aspect, alone or in combination with one or more of the first through seventeenth aspects, the interruption includes at least one of an interruption to an uplink operation or an interruption to a downlink operation.

In a nineteenth aspect, alone or in combination with one or more of the first through eighteenth aspects, the interruption to the uplink operation is signaled jointly with the interruption to the downlink operation.

In a twentieth aspect, alone or in combination with one or more of the first through nineteenth aspects, the interruption to the uplink operation is signaled separately from the interruption to the downlink operation.

In a twenty-first aspect, alone or in combination with one or more of the first through twentieth aspects, the carrier switching capability indicates at least one of: whether a carrier switch to one of the first RAT or the second RAT affects a first operation on the other of the first RAT or the second RAT, or whether a carrier switch to at least one of the first RAT, a first frequency range of the second RAT, or a second frequency range of the second RAT affects a second operation on another one of the first RAT, the first frequency range, or the second frequency range.

In a twenty-second aspect, alone or in combination with one or more of the first through twenty-first aspects, the first operation or the second operation includes at least one of an uplink operation or a downlink operation.

In a twenty-third aspect, alone or in combination with one or more of the first through twenty-second aspects, an interruption to the uplink operation is signaled jointly with an interruption to the downlink operation.

In a twenty-fourth aspect, alone or in combination with one or more of the first through twenty-third aspects, an interruption to the uplink operation is signaled separately from an interruption to the downlink operation.

In a twenty-fifth aspect, alone or in combination with one or more of the first through twenty-fourth aspects, the first RAT is a Long Term Evolution (LTE) RAT and the second RAT is a New Radio (NR) RAT having a sub-6 GHz frequency range and a millimeter wave frequency range.

In a twenty-sixth aspect, alone or in combination with one or more of the first through twenty-fifth aspects, the carrier switching capability indicates whether a carrier switch to one of the LTE RAT or the sub-6 GHz frequency range affects the other one of the LTE RAT or the sub-6 GHz frequency range, without indicating whether a carrier switch to the millimeter wave band affects the LTE RAT or the sub-6 GHz frequency range.

In a twenty-seventh aspect, alone or in combination with one or more of the first through twenty-sixth aspects, at least one of the antenna switching capability or the carrier switching capability indicates a switching time or an interruption time, and the switching time or the interruption time is indicated using a configured or predefined granularity.

In a twenty-eighth aspect, alone or in combination with one or more of the first through twenty-seventh aspects, the granularity is a symbol duration for a subcarrier spacing of 15 kilohertz.

In a twenty-ninth aspect, alone or in combination with one or more of the first through twenty-eighth aspects, at least one of the antenna switching capability or the carrier switching capability indicates at least one of: a number of concurrent intra-RAT switches supported by the UE, a number of concurrent inter-RAT switches supported by the UE, or a combination thereof.

In a thirtieth aspect, alone or in combination with one or more of the first through twenty-ninth aspects, at least one of the antenna switching capability or the carrier switching capability indicates a number of concurrent intra-RAT switches supported by the UE for each of the first RAT and the second RAT.

In a thirty-first aspect, alone or in combination with one or more of the first through thirtieth aspects, one or more switching configurations are prohibited.

In a thirty-second aspect, alone or in combination with one or more of the first through thirty-first aspects, the one or more switching configurations are prohibited based at least on an interruption created by switching a band in one of the first RAT or the second RAT, wherein the interruption affects a physical channel or signal in the other of the first band of the first RAT or the second band of the second RAT.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
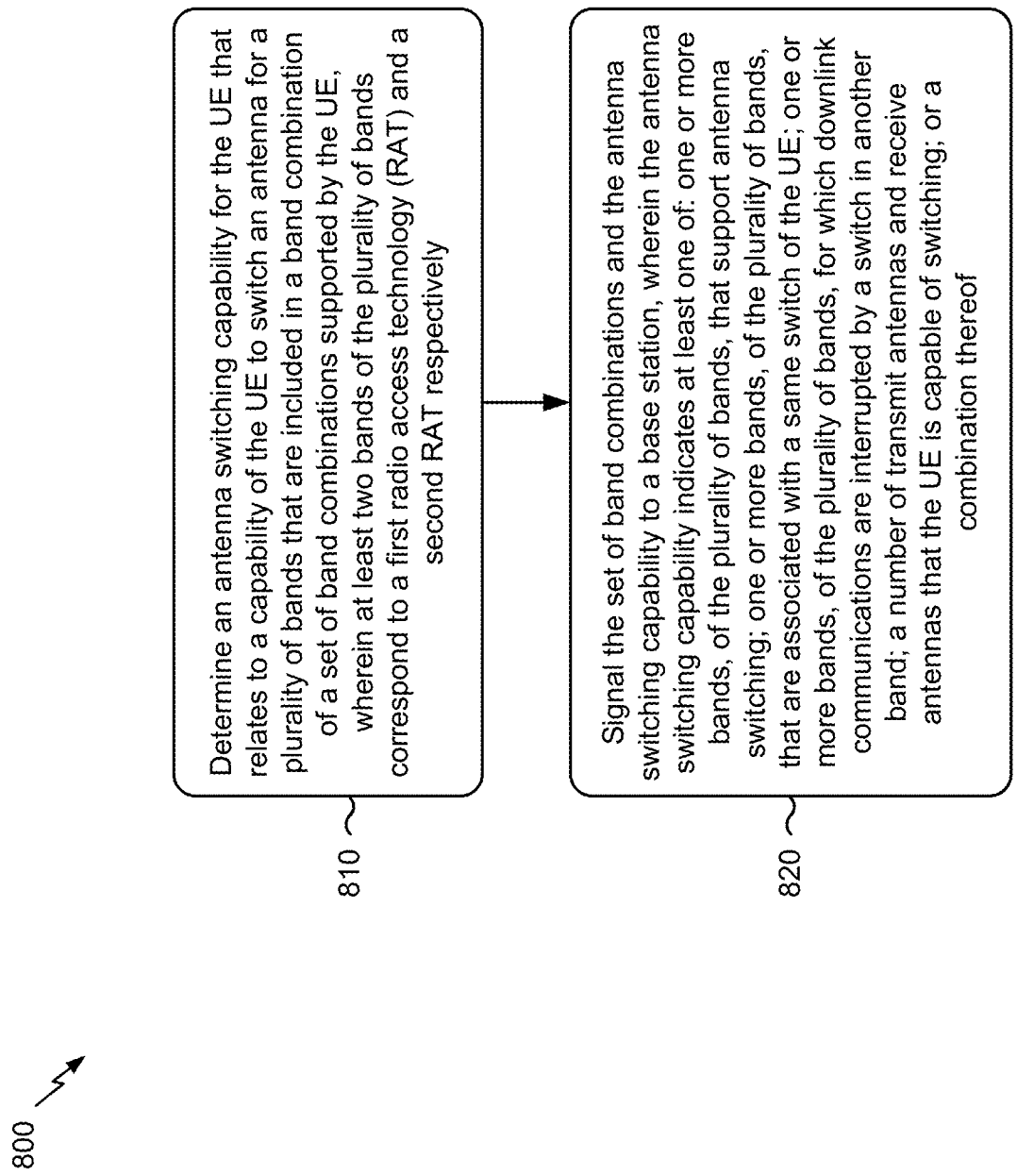

FIG. 8 is a diagram illustrating an example process 800 performed, for example, by a UE, in accordance with various aspects of the present disclosure. Example process 800 is an example where a UE (e.g., UE 120 and/or the like) performs operations associated with carrier switching and antenna switching for LTE and NR dual connectivity.

As shown in FIG. 8, in some aspects, process 800 may include determining an antenna switching capability for the UE that relates to a capability of the UE to switch an antenna for a plurality of bands that are included in a band combination of a set of band combinations supported by the UE, wherein at least two bands of the plurality of bands correspond to a first radio access technology (RAT) and a second RAT respectively (block 810). For example, the UE (e.g., using controller/processor 280, memory 282, and/or the like) may determine an antenna switching capability for the UE that relates to a capability of the UE to switch an antenna for a plurality of bands that are included in a band combination of a set of band combinations supported by the UE, as described above. In some aspects, at least two bands of the plurality of bands correspond to a first RAT and a second RAT respectively.

As further shown in FIG. 8, in some aspects, process 800 may include signaling the set of band combinations and the antenna switching capability to a base station, wherein the antenna switching capability indicates at least one of: one or more bands, of the plurality of bands, that support antenna switching; one or more bands, of the plurality of bands, that are associated with a same switch of the UE; one or more bands, of the plurality of bands, for which downlink communications are interrupted by a switch in another band; a number of transmit antennas and receive antennas that the UE is capable of switching; or a combination thereof (block 820). For example, the UE (e.g., using transmit processor 264, controller/processor 280, memory 282, and/or the like) may signal the set of band combinations and the antenna switching capability to a base station, as described above. In some aspects, the antenna switching capability indicates at least one of: one or more bands, of the plurality of bands, that support antenna switching; one or more bands, of the plurality of bands, that are associated with a same switch of the UE; one or more bands, of the plurality of bands, for which downlink communications are interrupted by a switch in another band; a number of transmit antennas and receive antennas that the UE is capable of switching; or a combination thereof.

Process 800 may include additional aspects, such as any single aspect or any combination of aspects described below and/or in connection with one or more other processes described elsewhere herein.

In a first aspect, the capability of the UE to switch among the plurality of bands includes a capability to switch an antenna for one or more bands and/or a capability to switch from one or more bands to a different band.

In a second aspect, alone or in combination with the first aspect, the antenna switching capability indicates the number of transmit antennas and receive antennas that the UE is capable of switching.

In a third aspect, alone or in combination with one or more of the first and second aspects, the antenna switching capability indicates whether a first band, associated with the first RAT, and a second band, associated with the second RAT, are associated with a same switch of the UE.

In a fourth aspect, alone or in combination with one or more of the first through third aspects, the antenna switching capability indicates whether downlink communications of one of a first band, associated with the first RAT, or a second band, associated with the second RAT, are interrupted by a switch in the other of the first band or the second band.

In a fifth aspect, alone or in combination with one or more of the first through fourth aspects, process 800 includes signaling a carrier switching capability to the base station, and the carrier switching capability indicates an interruption time to at least one of an uplink operation or a downlink operation due to a switch from a source band, of the plurality of bands, to a target band of the plurality of bands.

In a sixth aspect, alone or in combination with one or more of the first through fifth aspects, the source band is one of a first band of the first RAT or a second band of the second RAT, and the target band is the other of the first band of the first RAT or the second band of the second RAT.

In a seventh aspect, alone or in combination with one or more of the first through sixth aspects, the UE is configured to determine whether to switch from the source band to the target band based at least in part on a type of information to be transmitted in at least one of the source band or the target band.

In an eighth aspect, alone or in combination with one or more of the first through seventh aspects, the source band and the target band are associated with a same RAT, and the carrier switching capability does not indicate inter-RAT interruption times.

In a ninth aspect, alone or in combination with one or more of the first through eighth aspects, the carrier switching capability indicates one or more bands, of the plurality of bands, that experience an interruption when a sounding reference signal (SRS) is transmitted in a band, of the plurality of bands, without an uplink capability.

In a tenth aspect, alone or in combination with one or more of the first through ninth aspects, the carrier switching capability indicates at least one of: whether a carrier switch to one of the first RAT or the second RAT affects a first operation on the other of the first RAT or the second RAT, or whether a carrier switch to at least one of the first RAT, a first frequency range of the second RAT, or a second frequency range of the second RAT affects a second operation on another one of the first RAT, the first frequency range, or the second frequency range.

In an eleventh aspect, alone or in combination with one or more of the first through tenth aspects, the first RAT is a Long Term Evolution (LTE) RAT and the second RAT is a New Radio (NR) RAT having a sub-6 GHz frequency range and a millimeter wave frequency range.

In a twelfth aspect, alone or in combination with one or more of the first through eleventh aspects, the carrier switching capability indicates whether a carrier switch to one of the LTE RAT or the sub-6 GHz frequency range affects the other one of the LTE RAT or the sub-6 GHz frequency range, without indicating whether a carrier switch to the millimeter wave band affects the LTE RAT or the sub-6 GHz frequency range.

In a thirteenth aspect, alone or in combination with one or more of the first through twelfth aspects, the antenna switching capability indicates a switching time or an interruption time, and the switching time or the interruption time is indicated using a configured or predefined granularity.

In a fourteenth aspect, alone or in combination with one or more of the first through thirteenth aspects, the antenna switching capability indicates at least one of: a number of concurrent intra-RAT switches supported by the UE, a number of concurrent inter-RAT switches supported by the UE, or a combination thereof.

In a fifteenth aspect, alone or in combination with one or more of the first through fourteenth aspects, the antenna switching capability indicates a number of concurrent intra-RAT switches supported by the UE for each of the first RAT and the second RAT.

In a sixteenth aspect, alone or in combination with one or more of the first through fifteenth aspects, a determination of whether to transmit a sounding reference signal on a band, of the plurality of bands, is based at least in part on a channel that would be interrupted due to the SRS.

In a seventeenth aspect, alone or in combination with one or more of the first through sixteenth aspects, each band combination, in the set of band combinations, includes a number of bands corresponding to a number of transmit chains of the UE, and wherein each transmit chain capable of switching between two or more bands is capable of switching to one of the two or more bands to form the band combination.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

FIG. 9 is a diagram illustrating an example process 900 performed, for example, by a base station, in accordance with various aspects of the present disclosure. Example process 900 is an example where a base station (e.g., base station 110 and/or the like) performs operations associated with carrier switching and antenna switching for LTE and NR dual connectivity.

As shown in FIG. 9, in some aspects, process 900 may include receiving information that identifies an antenna switching capability of a UE that relates to a capability of the UE to switch an antenna for a plurality of bands that are included in a band combination of a set of band combinations supported by the UE, wherein at least two bands of the plurality of bands correspond to a first RAT and a second RAT respectively, and wherein the antenna switching capability indicates at least one of: one or more bands, of the plurality of bands, that support antenna switching; one or more bands, of the plurality of bands, that are associated with a same switch of the UE; one or more bands, of the plurality of bands, for which downlink communications are interrupted by a switch in another band; a number of transmit antennas and receive antennas that the UE is capable of switching; or a combination thereof (block 910). For example, the base station (e.g., using receive processor 238, controller/processor 240, memory 242, and/or the like) may receive information that identifies an antenna switching capability of a UE that relates to a capability of the UE to switch an antenna for a plurality of bands that are included in a band combination of a set of band combinations supported by the UE, as described above. In some aspects, at least two bands of the plurality of bands correspond to a first RAT and a second RAT respectively. In some aspects, the antenna switching capability indicates at least one of: one or more bands, of the plurality of bands, that support antenna switching; one or more bands, of the plurality of bands, that are associated with a same switch of the UE; one or more bands, of the plurality of bands, for which downlink communications are interrupted by a switch in another band; a number of transmit antennas and receive antennas that the UE is capable of switching; or a combination thereof.

As further shown in FIG. 9, in some aspects, process 900 may include communicating with the UE based at least in part on the antenna switching capability (block 920). For example, the base station (e.g., using transmit processor 220, receive processor 238, controller/processor 240, memory 242, and/or the like) may communicate with the UE based at least in part on the antenna switching capability, as described above.

Process 900 may include additional aspects, such as any single aspect or any combination of aspects described below and/or in connection with one or more other processes described elsewhere herein.

In a first aspect, the capability of the UE to switch among the plurality of bands includes a capability to switch an antenna for one or more bands or a capability to switch from one or more bands to a different band.

In a second aspect, alone or in combination with the first aspect, the antenna switching capability indicates the number of transmit antennas and receive antennas that the UE is capable of switching.

In a third aspect, alone or in combination with one or more of the first and second aspects, the antenna switching capability indicates whether a first band, associated with the first RAT, and a second band, associated with the second RAT, are associated with a same switch of the UE.

In a fourth aspect, alone or in combination with one or more of the first through third aspects, the antenna switching capability indicates whether downlink communications of one of a first band, associated with the first RAT, or a second band, associated with the second RAT, are interrupted by a switch in the other of the first band or the second band.

In a fifth aspect, alone or in combination with one or more of the first through fourth aspects, the first RAT is a Long Term Evolution (LTE) RAT and the second RAT is a New Radio (NR) RAT having a sub-6 GHz frequency range and a millimeter wave frequency range.

In a sixth aspect, alone or in combination with one or more of the first through fifth aspects, the antenna switching capability indicates whether an antenna switch in one of the LTE RAT or the sub-6 GHz frequency range affects the other one of the LTE RAT or the sub-6 GHz frequency range without indicating whether an antenna switch in the millimeter wave band affects the LTE RAT or the sub-6 GHz frequency range.

In a seventh aspect, alone or in combination with one or more of the first through sixth aspects, process 900 includes receiving information that identifies a carrier switching capability of the UE, and the carrier switching capability indicates an interruption time to at least one of an uplink operation or a downlink operation due to a switch from a source band, of the plurality of bands, to a target band of the plurality of bands.

In an eighth aspect, alone or in combination with one or more of the first through seventh aspects, the source band is one of a first band of the first RAT or a second band of the second RAT, and the target band is the other of the first band of the first RAT or the second band of the second RAT.

In a ninth aspect, alone or in combination with one or more of the first through eighth aspects, the source band and the target band are associated with a same RAT, and the carrier switching capability does not indicate inter-RAT interruption times.

In a tenth aspect, alone or in combination with one or more of the first through ninth aspects, the carrier switching capability indicates one or more bands, of the plurality of bands, that experience an interruption when a SRS is transmitted in a band, of the plurality of bands, without an uplink capability.

In an eleventh aspect, alone or in combination with one or more of the first through tenth aspects, the carrier switching capability indicates at least one of: whether a carrier switch to one of the first RAT or the second RAT affects a first operation on the other of the first RAT or the second RAT, or whether a carrier switch to at least one of the first RAT, a first frequency range of the second RAT, or a second frequency range of the second RAT affects a second operation on another one of the first RAT, the first frequency range, or the second frequency range.

In a twelfth aspect, alone or in combination with one or more of the first through eleventh aspects, the first RAT is a Long Term Evolution (LTE) RAT and the second RAT is a New Radio (NR) RAT having a sub-6 GHz frequency range and a millimeter wave frequency range.

In a thirteenth aspect, alone or in combination with one or more of the first through twelfth aspects, the carrier switching capability indicates whether a carrier switch to one of the LTE RAT or the sub-6 GHz frequency range affects the other one of the LTE RAT or the sub-6 GHz frequency range without indicating whether a carrier switch to the millimeter wave band affects the LTE RAT or the sub-6 GHz frequency range.

In a fourteenth aspect, alone or in combination with one or more of the first through thirteenth aspects, the antenna switching capability indicates a switching time or an interruption time, and the switching time or the interruption time is indicated using a configured or predefined granularity.

In a fifteenth aspect, alone or in combination with one or more of the first through fourteenth aspects, the antenna switching capability indicates at least one of: a number of concurrent intra-RAT switches supported by the UE, a number of concurrent inter-RAT switches supported by the UE, or a combination thereof.

In a sixteenth aspect, alone or in combination with one or more of the first through fifteenth aspects, the antenna switching capability indicates a number of concurrent intra-RAT switches supported by the UE for each of the first RAT and the second RAT.

In a seventeenth aspect, alone or in combination with one or more of the first through sixteenth aspects, each band combination, in the set of band combinations, includes a number of bands corresponding to a number of transmit chains of the UE, and wherein each transmit chain capable of switching between two or more bands is capable of switching to one of the two or more bands to form the band combination.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

The following provides an overview of further examples of the present invention:

1. A method of wireless communication performed by a user equipment (UE), comprising:
   determining an antenna switching capability for the UE that relates to a capability of the UE to switch an antenna for a plurality of bands that are included in a band combination of a set of band combinations supported by the UE, wherein at least two bands of the plurality of bands correspond to a first radio access technology (RAT) and a second RAT respectively; and
   signaling the set of band combinations and the antenna switching capability to a base station, wherein the antenna switching capability indicates at least one of:
     one or more bands, of the plurality of bands, that support antenna switching;
     one or more bands, of the plurality of bands, that are associated with a same switch of the UE;
     one or more bands, of the plurality of bands, for which downlink communications are interrupted by a switch in another band;
     a number of transmit antennas and receive antennas that the UE is capable of switching; or
     a combination thereof.

2. The method of example 1, wherein each band combination, in the set of band combinations, includes a number of bands corresponding to a number of transmit chains of the UE, and wherein each transmit chain capable of switching between two or more bands is capable of switching to one of the two or more bands to form the band combination.

3. The method of any of examples 1 or 2, wherein the antenna switching capability indicates the number of transmit antennas and receive antennas that the UE is capable of switching.

4. The method of any of the preceding examples, wherein the antenna switching capability indicates whether a first band, associated with the first RAT, and a second band, associated with the second RAT, are associated with a same switch of the UE.

5. The method of any of the preceding examples, wherein the antenna switching capability indicates whether downlink communications of one of a first band, associated with the first RAT, or a second band, associated with the second RAT, are interrupted by a switch in the other of the first band or the second band.

6. The method of any of the preceding examples, further comprising signaling a carrier switching capability to the base station, wherein the carrier switching capability indicates an interruption time to at least one of an uplink operation or a downlink operation due to a switch from a source band, of the plurality of bands, to a target band of the plurality of bands.

7. The method of example 6, wherein the source band is one of a first band of the first RAT or a second band of the second RAT, and the target band is the other of the first band of the first RAT or the second band of the second RAT.

8. The method of example 7, wherein the UE is configured to determine whether to switch from the source band to the target band based at least in part on a type of information to be transmitted in at least one of the source band or the target band.

9. The method of example 6, wherein the source band and the target band are associated with a same RAT, and wherein the carrier switching capability does not indicate inter-RAT interruption times.

10. The method of example 6, wherein the carrier switching capability indicates one or more bands, of the plurality of bands, that experience an interruption when a sounding reference signal (SRS) is transmitted in a band, of the plurality of bands, without an uplink capability.

11. The method of example 6, wherein the carrier switching capability indicates at least one of:
    whether a carrier switch to one of the first RAT or the second RAT affects a first operation on the other of the first RAT or the second RAT, or
    whether a carrier switch to at least one of the first RAT, a first frequency range of the second RAT, or a second frequency range of the second RAT affects a second operation on another one of the first RAT, the first frequency range, or the second frequency range.

12. The method of example 6, wherein the first RAT is a Long Term Evolution (LTE) RAT and the second RAT is a New Radio (NR) RAT having a sub-6 GHz frequency range and a millimeter wave frequency range.

13. The method of example 12, wherein the carrier switching capability indicates whether a carrier switch to one of the LTE RAT or the sub-6 GHz frequency range affects the other one of the LTE RAT or the sub-6 GHz frequency range without indicating whether a carrier switch to the millimeter wave band affects the LTE RAT or the sub-6 GHz frequency range.

14. The method of any of the preceding examples, wherein the antenna switching capability indicates a switching time or an interruption time, wherein the switching time or the interruption time is indicated using a configured or pre-defined granularity.

15. The method of any of the preceding examples, wherein the antenna switching capability indicates at least one of:
    a number of concurrent intra-RAT switches supported by the UE,
    a number of concurrent inter-RAT switches supported by the UE, or
    a combination thereof.

16. The method of any of the preceding examples, wherein the antenna switching capability indicates a number of concurrent intra-RAT switches supported by the UE for each of the first RAT and the second RAT.

17. The method of any of the preceding examples, wherein a determination of whether to transmit a sounding reference signal (SRS) on a band, of the plurality of bands, is based at least in part on a channel that would be interrupted due to the SRS.

18. A method of wireless communication performed by a base station, comprising:
    receiving information that identifies an antenna switching capability of a user equipment (UE) that relates to a capability of the UE to switch an antenna for a plurality of bands that are included in a band combination of a set of band combinations supported by the UE, wherein at least two bands of the plurality of bands correspond to a first radio access technology (RAT) and a second RAT respectively, and wherein the antenna switching capability indicates at least one of:
one or more bands, of the plurality of bands, that support antenna switching;
one or more bands, of the plurality of bands, that are associated with a same switch of the UE;
one or more bands, of the plurality of bands, for which downlink communications are interrupted by a switch in another band;
a number of transmit antennas and receive antennas that the UE is capable of switching; or
a combination thereof; and
communicating with the UE based at least in part on the antenna switching capability.

19. The method of example 18, wherein each band combination, in the set of band combinations, includes a number of bands corresponding to a number of transmit chains of the UE, and wherein each transmit chain capable of switching between two or more bands is capable of switching to one of the two or more bands to form the band combination.

20. The method of any of examples 18 or 19, wherein the antenna switching capability indicates the number of transmit antennas and receive antennas that the UE is capable of switching.

21. The method of any of examples 18 to 20, wherein the antenna switching capability indicates whether a first band, associated with the first RAT, and a second band, associated with the second RAT, are associated with a same switch of the UE.

22. The method of any of examples 18 to 21, wherein the antenna switching capability indicates whether downlink communications of one of a first band, associated with the first RAT, or a second band, associated with the second RAT, are interrupted by a switch in the other of the first band or the second band.

23. The method of any of examples 18 to 22, wherein the first RAT is a Long Term Evolution (LTE) RAT and the second RAT is a New Radio (NR) RAT having a sub-6 GHz frequency range and a millimeter wave frequency range.

24. The method of example 23, wherein the antenna switching capability indicates whether an antenna switch in one of the LTE RAT or the sub-6 GHz frequency range affects the other one of the LTE RAT or the sub-6 GHz frequency range without indicating whether an antenna switch in the millimeter wave band affects the LTE RAT or the sub-6 GHz frequency range.

25. The method of any of examples 18 to 24, further comprising receiving information that identifies a carrier switching capability of the UE, wherein the carrier switching capability indicates an interruption time to at least one of an uplink operation or a downlink operation due to a switch from a source band, of the plurality of bands, to a target band of the plurality of bands.

26. The method of example 25, wherein the source band is one of a first band of the first RAT or a second band of the second RAT, and the target band is the other of the first band of the first RAT or the second band of the second RAT.

27. The method of example 26, wherein the source band and the target band are associated with a same RAT, and wherein the carrier switching capability does not indicate inter-RAT interruption times.

28. The method of example 25, wherein the carrier switching capability indicates one or more bands, of the plurality of bands, that experience an interruption when a sounding reference signal (SRS) is transmitted in a band, of the plurality of bands, without an uplink capability.

29. The method of example 25, wherein the carrier switching capability indicates at least one of:
whether a carrier switch to one of the first RAT or the second RAT affects a first operation on the other of the first RAT or the second RAT, or
whether a carrier switch to at least one of the first RAT, a first frequency range of the second RAT, or a second frequency range of the second RAT affects a second operation on another one of the first RAT, the first frequency range, or the second frequency range.

30. The method of example 25, wherein the first RAT is a Long Term Evolution (LTE) RAT and the second RAT is a New Radio (NR) RAT having a sub-6 GHz frequency range and a millimeter wave frequency range.

31. The method of example 30, wherein the carrier switching capability indicates whether a carrier switch to one of the LTE RAT or the sub-6 GHz frequency range affects the other one of the LTE RAT or the sub-6 GHz frequency range without indicating whether a carrier switch to the millimeter wave band affects the LTE RAT or the sub-6 GHz frequency range.

32. The method of any of examples 18 to 31, wherein the antenna switching capability indicates a switching time or an interruption time, wherein the switching time or the interruption time is indicated using a configured or predefined granularity.

33. The method of any of examples 18 to 32, wherein the antenna switching capability indicates at least one of:
a number of concurrent intra-RAT switches supported by the UE,
a number of concurrent inter-RAT switches supported by the UE, or
a combination thereof.

34. The method of any of examples 18 to 33, wherein the antenna switching capability indicates a number of concurrent intra-RAT switches supported by the UE for each of the first RAT and the second RAT.

35. A user equipment (UE) for wireless communication, comprising:
a memory; and
one or more processors operatively coupled to the memory, the memory and the one or more processors configured to:
determine an antenna switching capability for the UE that relates to a capability of the UE to switch an antenna for a plurality of bands that are included in a band combination of a set of band combinations supported by the UE, wherein at least two bands of the plurality of bands correspond to a first radio access technology (RAT) and a second RAT respectively; and
signal the set of band combinations and the antenna switching capability to a base station, wherein the antenna switching capability indicates at least one of:
one or more bands, of the plurality of bands, that support antenna switching;
one or more bands, of the plurality of bands, that are associated with a same switch of the UE;
one or more bands, of the plurality of bands, for which downlink communications are interrupted by a switch in another band;
a number of transmit antennas and receive antennas that the UE is capable of switching; or
a combination thereof.

36. The UE of example 35, wherein each band combination, in the set of band combinations, includes a number of bands corresponding to a number of transmit chains of the UE, and wherein each transmit chain capable of switching between two or more bands is capable of switching to one of the two or more bands to form the band combination.

37. The UE of any of examples 35 or 36, wherein the antenna switching capability indicates the number of transmit antennas and receive antennas that the UE is capable of switching.

38. The UE of any of examples 35 to 37, wherein the antenna switching capability indicates whether a first band, associated with the first RAT, and a second band, associated with the second RAT, are associated with a same switch of the UE.

39. The UE of any of examples 35 to 38, wherein the antenna switching capability indicates whether downlink communications of one of a first band, associated with the first RAT, or a second band, associated with the second RAT, are interrupted by a switch in the other of the first band or the second band.

40. The UE of any of examples 35 to 39, wherein the UE is further configured to signal a carrier switching capability to the base station, wherein the carrier switching capability indicates an interruption time to at least one of an uplink operation or a downlink operation due to a switch from a source band, of the plurality of bands, to a target band of the plurality of bands.

41. The UE of example 40, wherein the source band is one of a first band of the first RAT or a second band of the second RAT, and the target band is the other of the first band of the first RAT or the second band of the second RAT.

42. The UE of example 40, wherein the source band and the target band are associated with a same RAT, and wherein the carrier switching capability does not indicate inter-RAT interruption times.

43. The UE of example 40, wherein the carrier switching capability indicates at least one of:

whether a carrier switch to one of the first RAT or the second RAT affects a first operation on the other of the first RAT or the second RAT, or whether a carrier switch to at least one of the first RAT, a first frequency range of the second RAT, or a second frequency range of the second RAT affects a second operation on another one of the first RAT, the first frequency range, or the second frequency range.

44. The UE of any of examples 35 to 43, wherein the antenna switching capability indicates a switching time or an interruption time, wherein the switching time or the interruption time is indicated using a configured or predefined granularity.

45. The UE of any of examples 35 to 44, wherein the antenna switching capability indicates at least one of:

a number of concurrent intra-RAT switches supported by the UE, a number of concurrent inter-RAT switches supported by the UE, or a combination thereof.

46. The UE of any of examples 35 to 45, wherein the antenna switching capability indicates a number of concurrent intra-RAT switches supported by the UE for each of the first RAT and the second RAT.

47. A base station for wireless communication, comprising:

a memory; and one or more processors operatively coupled to the memory, the memory and the one or more processors configured to:

receive information that identifies an antenna switching capability of a user equipment (UE) that relates to a capability of the UE to switch an antenna for a plurality of bands that are included in a band combination of a set of band combinations supported by the UE, wherein at least two bands of the plurality of bands correspond to a first radio access technology (RAT) and a second RAT respectively, and wherein the antenna switching capability indicates at least one of:

one or more bands, of the plurality of bands, that support antenna switching;

one or more bands, of the plurality of bands, that are associated with a same switch of the UE;

one or more bands, of the plurality of bands, for which downlink communications are interrupted by a switch in another band;

a number of transmit antennas and receive antennas that the UE is capable of switching; or a combination thereof; and communicate with the UE based at least in part on the antenna switching capability.

48. The base station of example 47, wherein each band combination, in the set of band combinations, includes a number of bands corresponding to a number of transmit chains of the UE, and wherein each transmit chain capable of switching between two or more bands is capable of switching to one of the two or more bands to form the band combination.

49. The base station of any of examples 47 or 48, wherein the antenna switching capability indicates the number of transmit antennas and receive antennas that the UE is capable of switching.

50. The base station of any of examples 47 to 49, wherein the antenna switching capability indicates whether a first band, associated with the first RAT, and a second band, associated with the second RAT, are associated with a same switch of the UE.

51. The base station of any of examples 47 to 50, wherein the antenna switching capability indicates whether downlink communications of one of a first band, associated with the first RAT, or a second band, associated with the second RAT, are interrupted by a switch in the other of the first band or the second band.

52. The base station of any of examples 47 to 51, wherein the base station is further configured to receive information that identifies a carrier switching capability of the UE, wherein the carrier switching capability indicates an interruption time to at least one of an uplink operation or a downlink operation due to a switch from a source band, of the plurality of bands, to a target band of the plurality of bands.

53. The base station of example 52, wherein the source band is one of a first band of the first RAT or a second band of the second RAT, and the target band is the other of the first band of the first RAT or the second band of the second RAT.

54. The base station of example 53, wherein the source band and the target band are associated with a same RAT, and wherein the carrier switching capability does not indicate inter-RAT interruption times.

55. The base station of any of examples 47 to 54, wherein the antenna switching capability indicates at least one of:

a number of concurrent intra-RAT switches supported by the UE, a number of concurrent inter-RAT switches supported by the UE, or a combination thereof.

The base station of any of examples 47 to 55, wherein the antenna switching capability indicates a number of concurrent intra-RAT switches supported by the UE for each of the first RAT and the second RAT.

What is claimed is:

1. A method of wireless communication performed by a user equipment (UE), comprising:
   determining information regarding an antenna switching capability for dual connectivity of the UE that relates to a capability of the UE to switch an antenna for a plurality of bands that are included in a band combination supported by the UE,
      wherein at least a first band, of the plurality of bands, corresponds to a first radio access technology (RAT) and at least a second band, of the plurality of bands, corresponds to a second RAT; and
   signaling the information regarding the antenna switching capability for the dual connectivity to a network entity, wherein the information regarding the antenna switching capability for the dual connectivity indicates whether the first band corresponding to the first RAT and the second band corresponding to the second RAT are associated with switching together from a first antenna to a second antenna.

2. The method of claim 1, wherein the band combination includes a number of bands corresponding to a number of transmit chains of the UE, and wherein each transmit chain capable of switching between multiple bands is capable of switching to one of the first band corresponding to the first RAT or the second band corresponding to the second RAT to form the band combination.

3. The method of claim 1, wherein the antenna switching capability for the dual connectivity further indicates at least one of:
   a number of transmit antennas and receive antennas that the UE is capable of switching, or
   one or more bands, of the plurality of bands, for which downlink communications are interrupted by a switch in another band.

4. The method of claim 1, wherein the antenna switching capability for the dual connectivity further indicates whether downlink communications of one of the first band corresponding to the first RAT or the second band corresponding to the second RAT is interrupted by a switch in the other of the first band corresponding to the first RAT or the second band corresponding to the second RAT.

5. The method of claim 1, further comprising signaling a carrier switching capability to the network entity, wherein the carrier switching capability indicates an interruption time to at least one of an uplink operation or a downlink operation due to a switch from a source band, of the plurality of bands, to a target band of the plurality of bands.

6. The method of claim 5, wherein the source band is one of the first band corresponding to the first RAT or the second band corresponding to the second RAT, and the target band is the other of the first band corresponding to the first RAT or the second band corresponding to the second RAT.

7. The method of claim 5, further comprising determining whether to switch from the source band to the target band based at least in part on a type of information to be transmitted in at least one of the source band or the target band.

8. The method of claim 5, wherein the source band and the target band are associated with a same RAT, and wherein the carrier switching capability does not indicate inter-RAT interruption times.

9. The method of claim 5, wherein the second RAT has a sub-6 GHz frequency range and a millimeter wave frequency range.

10. The method of claim 9, wherein the carrier switching capability indicates whether a carrier switch to one of the first RAT or the sub-6 GHz frequency range affects the other one of the first RAT or the sub-6 GHz frequency range without indicating whether a carrier switch to the millimeter wave frequency range affects the first RAT or the sub-6 GHz frequency range.

11. The method of claim 1, wherein a carrier switching capability indicates one or more bands, of the plurality of bands, that experience an interruption when a sounding reference signal (SRS) is transmitted in a band, of the plurality of bands, without an uplink capability.

12. The method of claim 1 wherein a carrier switching capability indicates at least one of:
   whether a carrier switch to one of the first RAT or the second RAT affects a first operation on the other of the first RAT or the second RAT, or
   whether a carrier switch to at least one of the first RAT, a first frequency range of the second RAT, or a second frequency range of the second RAT affects a second operation on another one of the first RAT, the first frequency range, or the second frequency range.

13. The method of claim 1, wherein the antenna switching capability for the dual connectivity further indicates a switching time or an interruption time, wherein the switching time or the interruption time is indicated using a configured or predefined granularity.

14. The method of claim 1, wherein the antenna switching capability for the dual connectivity further indicates at least one of:
   a number of concurrent intra-RAT switches supported by the UE, or
   a number of concurrent inter-RAT switches supported by the UE.

15. The method of claim 1, wherein the antenna switching capability for the dual connectivity further indicates a number of concurrent intra-RAT switches supported by the UE for each of the first RAT and the second RAT.

16. The method of claim 1, wherein a determination of whether to transmit a sounding reference signal (SRS) on a band, of the plurality of bands, is based at least in part on a channel that would be interrupted due to the SRS.

17. A method of wireless communication performed by a network entity, comprising:
   receiving information that identifies an antenna switching capability for dual connectivity of a user equipment (UE) that relates to a capability of the UE to switch an antenna for a plurality of bands that are included in a band combination supported by the UE,
      wherein at least a first band, of the plurality of bands, corresponds to a first radio access technology (RAT) and at least a second band, of the plurality of bands, corresponds to a second RAT, and
      wherein the information that identifies the antenna switching capability for the dual connectivity indicates whether the first band corresponding to the first RAT and the second band corresponding to the second RAT are associated with switching together from a first antenna to a second antenna; and
   communicating with the UE based at least in part on the antenna switching capability for the dual connectivity.

18. The method of claim 17, wherein the band combination includes a number of bands corresponding to a number of transmit chains of the UE, and wherein each transmit chain capable of switching between multiple bands is capable of switching to one of the first band corresponding to the first RAT or the second band corresponding to the second RAT to form the band combination.

19. The method of claim 17, wherein the antenna switching capability for the dual connectivity further indicates at least one of:
a number of transmit antennas and receive antennas that the UE is capable of switching, or
one or more bands, of the plurality of bands, for which downlink communications are interrupted by a switch in another band.

20. The method of claim 17, wherein the antenna switching capability for the dual connectivity indicates further whether downlink communications of one of the first band corresponding to the first RAT or the second band corresponding to the second RAT is interrupted by a switch in the other of the first band corresponding to the first RAT or the second band corresponding to the second RAT.

21. The method of claim 17, wherein the second RAT has a sub-6 GHz frequency range and a millimeter wave frequency range.

22. The method of claim 21, wherein the antenna switching capability for the dual connectivity further indicates whether an antenna switch in one of the first RAT or the sub-6 GHz frequency range affects the other one of the first RAT or the sub-6 GHz frequency range without indicating whether an antenna switch in the millimeter wave frequency range affects the first RAT or the sub-6 GHz frequency range.

23. The method of claim 17, further comprising receiving information that identifies a carrier switching capability of the UE, wherein the carrier switching capability indicates an interruption time to at least one of an uplink operation or a downlink operation due to a switch from a source band, of the plurality of bands, to a target band of the plurality of bands.

24. The method of claim 23, wherein the source band is one of the first band corresponding to the first RAT or the second band corresponding to the second RAT, and the target band is the other of the first band corresponding to the first RAT or the second band corresponding to the second RAT.

25. The method of claim 23, wherein the source band and the target band are associated with a same RAT, and wherein the carrier switching capability does not indicate inter-RAT interruption times.

26. The method of claim 23, wherein the second RAT has a sub-6 GHz frequency range and a millimeter wave frequency range.

27. The method of claim 26, wherein the carrier switching capability indicates whether a carrier switch to one of the first RAT or the sub-6 GHz frequency range affects the other one of the first RAT or the sub-6 GHz frequency range without indicating whether a carrier switch to the millimeter wave frequency range affects the first RAT or the sub-6 GHz frequency range.

28. The method of claim 17, wherein a carrier switching capability indicates one or more bands, of the plurality of bands, that experience an interruption when a sounding reference signal (SRS) is transmitted in a band, of the plurality of bands, without an uplink capability.

29. The method of claim 17, wherein a carrier switching capability indicates at least one of:
whether a carrier switch to one of the first RAT or the second RAT affects a first operation on the other of the first RAT or the second RAT, or
whether a carrier switch to at least one of the first RAT, a first frequency range of the second RAT, or a second frequency range of the second RAT affects a second operation on another one of the first RAT, the first frequency range, or the second frequency range.

30. The method of claim 17, wherein the antenna switching capability for the dual connectivity further indicates a switching time or an interruption time, wherein the switching time or the interruption time is indicated using a configured or predefined granularity.

31. The method of claim 17, wherein the antenna switching capability for the dual connectivity further indicates at least one of:
a number of concurrent intra-RAT switches supported by the UE, or
a number of concurrent inter-RAT switches supported by the UE.

32. The method of claim 17, wherein the antenna switching capability for the dual connectivity further indicates a number of concurrent intra-RAT switches supported by the UE for each of the first RAT and the second RAT.

33. A user equipment (UE) for wireless communication, comprising:
one or more memories; and
one or more processors coupled to the one or more memories, the one or more processors configured to:
determine information regarding an antenna switching capability for dual connectivity of the UE that relates to a capability of the UE to switch an antenna for a plurality of bands that are included in a band combination supported by the UE,
wherein at least a first band, of the plurality of bands, corresponds to a first radio access technology (RAT) and at least a second band, of the plurality of bands, corresponds to a second RAT; and
signal the information regarding the antenna switching capability for the dual connectivity to a network entity,
wherein the information regarding the antenna switching capability for the dual connectivity indicates whether the first band corresponding to the first RAT and the second band corresponding to the second RAT are associated with switching together from a first antenna to a second antenna.

34. The UE of claim 33, wherein the band combination includes a number of bands corresponding to a number of transmit chains of the UE, and wherein each transmit chain capable of switching between multiple bands is capable of switching to one of the first band corresponding to the first RAT or the second band corresponding to the second RAT to form the band combination.

35. The UE of claim 33, wherein the antenna switching capability for the dual connectivity further indicates at least one of:
a number of transmit antennas and receive antennas that the UE is capable of switching, or
one or more bands, of the plurality of bands, for which downlink communications are interrupted by a switch in another band.

36. The UE of claim 33, wherein the antenna switching capability for the dual connectivity further indicates whether downlink communications of one of the first band corresponding to the first RAT or the second band corresponding to the second RAT is interrupted by a switch in the other of the first band corresponding to the first RAT or the second band corresponding to the second RAT.

37. The UE of claim 33, wherein the one or more processors are further configured to signal a carrier switching capability to the network entity, wherein the carrier switching capability indicates an interruption time to at least one of an uplink operation or a downlink operation due to a switch from a source band, of the plurality of bands, to a target band of the plurality of bands.

38. The UE of claim 37, wherein the source band is one of the first band corresponding to the first RAT or the second band corresponding to the second RAT, and the target band is the other of the first band corresponding to the first RAT or the second band corresponding to the second RAT.

39. The UE of claim 37, wherein the source band and the target band are associated with a same RAT, and wherein the carrier switching capability does not indicate inter-RAT interruption times.

40. The UE of claim 37, wherein the carrier switching capability indicates at least one of:
 whether a carrier switch to one of the first RAT or the second RAT affects a first operation on the other of the first RAT or the second RAT, or
 whether a carrier switch to at least one of the first RAT, a first frequency range of the second RAT, or a second frequency range of the second RAT affects a second operation on another one of the first RAT, the first frequency range, or the second frequency range.

41. The UE of claim 37, wherein the one or more processors are further configured to:
 determine whether to switch from the source band to the target band based at least in part on a type of information to be transmitted in at least one of the source band or the target band.

42. The UE of claim 33, wherein the antenna switching capability for the dual connectivity further indicates a switching time or an interruption time, wherein the switching time or the interruption time is indicated using a configured or predefined granularity.

43. The UE of claim 33, wherein the antenna switching capability for the dual connectivity further indicates at least one of:
 a number of concurrent intra-RAT switches supported by the UE, or
 a number of concurrent inter-RAT switches supported by the UE.

44. The UE of claim 33, wherein the antenna switching capability for the dual connectivity further indicates a number of concurrent intra-RAT switches supported by the UE for each of the first RAT and the second RAT.

45. The UE of claim 33, wherein a carrier switching capability indicates one or more bands, of the plurality of bands, that experience an interruption when a sounding reference signal (SRS) is transmitted in a band, of the plurality of bands, without an uplink capability.

46. A network entity for wireless communication, comprising:
 one or more memories; and
 one or more processors coupled to the one or more memories, the one or more processors configured to:
  receive information that identifies an antenna switching capability for dual connectivity of a user equipment (UE) that relates to a capability of the UE to switch an antenna for a plurality of bands that are included in a band combination supported by the UE,
   wherein at least a first band, of the plurality of bands, corresponds to a first radio access technology (RAT) and at least a second band, of the plurality of bands, corresponds to a second RAT, and
   wherein the information that identifies the antenna switching capability for the dual connectivity indicates whether the first band corresponding to the first RAT and the second band corresponding to the second RAT are associated with switching together from a first antenna to a second antenna; and
  communicate with the UE based at least in part on the antenna switching capability for the dual connectivity.

47. The network entity of claim 46, wherein the band combination includes a number of bands corresponding to a number of transmit chains of the UE, and wherein each transmit chain capable of switching between multiple bands is capable of switching to one of the first band corresponding to the first RAT or the second band corresponding to the second RAT to form the band combination.

48. The network entity of claim 46, wherein the antenna switching capability for the dual connectivity further indicates at least one of:
 a number of transmit antennas and receive antennas that the UE is capable of switching, or
 one or more bands, of the plurality of bands, for which downlink communications are interrupted by a switch in another band.

49. The network entity of claim 46, wherein the antenna switching capability for the dual connectivity further indicates whether downlink communications of one of the first band corresponding to the first RAT or the second band corresponding to the second RAT is interrupted by a switch in the other of the first band corresponding to the first RAT or the second band corresponding to the second RAT.

50. The network entity of claim 46, wherein the one or more processors are further configured to receive information that identifies a carrier switching capability of the UE, wherein the carrier switching capability indicates an interruption time to at least one of an uplink operation or a downlink operation due to a switch from a source band, of the plurality of bands, to a target band of the plurality of bands.

51. The network entity of claim 50, wherein the source band is one of the first band corresponding to the first RAT or the second band corresponding to the second RAT, and the target band is the other of the first band corresponding to the first RAT or the second band corresponding to the second RAT.

52. The network entity of claim 50, wherein the source band and the target band are associated with a same RAT, and wherein the carrier switching capability does not indicate inter-RAT interruption times.

53. The network entity of claim 46, wherein the antenna switching capability for the dual connectivity further indicates at least one of:
 a number of concurrent intra-RAT switches supported by the UE, or
 a number of concurrent inter-RAT switches supported by the UE.

54. The network entity of claim 46, wherein the antenna switching capability for the dual connectivity further indicates a number of concurrent intra-RAT switches supported by the UE for each of the first RAT and the second RAT.

55. The network entity of claim 46, wherein a carrier switching capability indicates one or more bands, of the plurality of bands, that experience an interruption when a sounding reference signal (SRS) is transmitted in a band, of the plurality of bands, without an uplink capability.

56. The network entity of claim 46, wherein a carrier switching capability indicates at least one of:
 whether a carrier switch to one of the first RAT or the second RAT affects a first operation on the other of the first RAT or the second RAT, or whether a carrier switch to at least one of the first RAT, a first frequency range of the second RAT, or a second frequency range of the second RAT affects a second operation on another one of the first RAT, the first frequency range, or the second frequency range.

57. The method of claim 1, wherein the dual connectivity is Long Term Evolution—New Radio (LTE-NR) dual connectivity, the first RAT is LTE RAT, and the second RAT is NR RAT.

58. The method of claim 1, wherein the first RAT is NR RAT, the second RAT is a RAT associated with a later generation-based communication system, and the dual connectivity is between the NR RAT and the RAT associated with the later generation-based communication system.

59. The method of claim 17, wherein the dual connectivity is Long Term Evolution—New Radio (LTE-NR) dual connectivity, the first RAT is LTE RAT, and the second RAT is NR RAT.

60. The method of claim 17, wherein the first RAT is NR RAT, the second RAT is a RAT associated with a later generation-based communication system, and the dual connectivity is between the NR RAT and the RAT associated with the later generation-based communication system.

61. The UE of claim 33, wherein the dual connectivity is Long Term Evolution—New Radio (LTE-NR) dual connectivity, the first RAT is LTE RAT, and the second RAT is NR RAT.

62. The UE of claim 33, wherein the first RAT is NR RAT, the second RAT is a RAT associated with a later generation-based communication system, and the dual connectivity is between the NR RAT and the RAT associated with the later generation-based communication system.

63. The network entity of claim 46, wherein the dual connectivity is Long Term Evolution—New Radio (LTE-NR) dual connectivity, the first RAT is LTE RAT, and the second RAT is NR RAT.

64. The network entity of claim 46, wherein the first RAT is NR RAT, the second RAT is a RAT associated with a later generation-based communication system, and the dual connectivity is between the NR RAT and the RAT associated with the later generation- based communication system.

* * * * *